(12) United States Patent
Nishiyama

(10) Patent No.: US 8,670,886 B2
(45) Date of Patent: Mar. 11, 2014

(54) HYBRID ELECTRIC POWER DEVICE FOR CRANE AND CONTROL METHOD OF HYBRID ELECTRIC POWER DEVICE FOR CRANE

(75) Inventor: Noriyuki Nishiyama, Ehime (JP)

(73) Assignee: Sumitomo Heavy Industries Material Handling Systems Co., Ltd., Tokyo (JP)

( * ) Notice: Subject to any disclaimer, the term of this patent is extended or adjusted under 35 U.S.C. 154(b) by 117 days.

(21) Appl. No.: 13/377,073

(22) Filed: Dec. 8, 2011

(65) Prior Publication Data

US 2012/0089287 A1 Apr. 12, 2012

Related U.S. Application Data

(63) Continuation of application No. PCT/JP2010/004016, filed on Jun. 16, 2010.

(30) Foreign Application Priority Data

Jun. 16, 2009 (JP) ................................. 2009-143017

(51) Int. Cl.
 *B60L 9/00* (2006.01)
(52) U.S. Cl.
 USPC .......................................................... 701/22
(58) Field of Classification Search
 None
 See application file for complete search history.

(56) References Cited

U.S. PATENT DOCUMENTS 5,936,375 A 8/1999 Enoki
6,123,163 A * 9/2000 Otsu et al. .................... 180/65.8
2008/0093864 A1 4/2008 Kagoshima et al.
2012/0035815 A1* 2/2012 Kawashima et al. ........... 701/50
2013/0058750 A1* 3/2013 Hiroki et al. ............... 414/744.2

FOREIGN PATENT DOCUMENTS

| EP | 2065331 A2 | 6/2009 |
| JP | 59-40533 | 3/1984 |
| JP | 11-217193 | 8/1999 |
| JP | 11-285165 | 10/1999 |
| JP | 2003-028071 | 1/2003 |
| JP | 2006-117341 | 5/2006 |
| WO | WO2008-050552 | 5/2008 |

OTHER PUBLICATIONS

International Search Report mailed on Sep. 14, 2010.

* cited by examiner

*Primary Examiner* — Thomas Tarcza
*Assistant Examiner* — Adam Alharbi
(74) *Attorney, Agent, or Firm* — IPUSA, PLLC

(57) ABSTRACT

A disclosed hybrid electric power source device for a crane includes an engine generator, an electric power accumulating unit, and a control unit for controlling the engine generator and the electric power accumulating unit, wherein the control unit includes an electric power load calculating part which acquires electric power loaded on the engine based on required electric power supplied to an outside and charging electric power of an electric power accumulating unit and a command signal sending part which calculates output torque and a revolution speed based on the electric power loaded on the engine calculated by the electric power load calculating part and generates a torque command signal and a revolution speed command signal.

18 Claims, 9 Drawing Sheets

HYBRID ELECTRIC POWER DEVICE FOR CRANE AND CONTROL METHOD OF HYBRID ELECTRIC POWER DEVICE FOR CRANE

CROSS-REFERENCE TO RELATED APPLICATIONS

This application is a U.S. continuation application filed under 35 U.S.C. 111(a) and 365(c) of PCT Application JP2010/004016, filed Jun. 16, 2010, which claims the benefit of Application Ser. No. 2009-143017, filed in Japan on Jun. 16, 2009. The foregoing applications are hereby incorporated herein by reference.

BACKGROUND OF THE INVENTION

1. Field of the Invention

The present invention relates to a hybrid electric power device for a crane and a control method of the hybrid electric power device for the crane. Some cranes such as a gantry crane and a jib crane mounted with tires driven by an engine generator are driven by a mechanism of running a motor or the like using the engine generator and a hybrid electric power source including an electric power accumulating unit such as a battery.

The present invention relates to a hybrid electric power device for a crane used in a facility such as the gantry crane and a control method of the hybrid electric power device for the crane.

2. Description of the Related Art

As an example, an engine generator including a diesel engine or the like has been used to drive an electric motor in a crane or the like and an electric motor for driving a pump. In this crane or the like, an electric power generated by an engine generator is supplied to the electric motor via a converter and an inverter, and an electric power accumulator such as a battery is arranged in parallel to the inverter in a line for supplying the electric power to the electric motor as disclosed in, for example, Patent Document 1 and Patent Document 2.

According to the techniques disclosed in Patent Documents 1 and 2, surplus electric power is stored in the electric power accumulator when the electric power required by the electric motor is small. Therefore, energy efficiency can become high. When the electric power required by the electric motor is greater, the electric power can be supplied to the electric generator from both the engine generator and the electric power accumulator. There is an advantage that the engine generator can be downsized.

PATENT DOCUMENT 1: Japanese Laid-Open Patent Application No. 11-217193
PATENT DOCUMENT 2: Japanese Laid-Open Patent Application No. 11-285165

With the techniques of Patent Documents 1 and 2, a load applied to the engine generator varies in proportion to the electric power necessary for the electric motor. Therefore, if the electric power necessary for the electric motor varies, the activated state of the engine generator also varies. Therefore, it is difficult to optimally maintain the operating state of the engine generator. Said differently, it is difficult to drive the engine generator while maintaining good fuel consumption.

PATENT DOCUMENT 1: Japanese Laid-Open Patent Application No. 11-217193
PATENT DOCUMENT 2: Japanese Laid-Open Patent Application No. 11-285165

SUMMARY OF THE INVENTION

The embodiments of the present invention may provide a novel and useful hybrid electric power device for the crane which can constantly maintain the fuel consumption of the engine generator and a control method of the hybrid electric power device for the crane.

According to a first aspect of the invention, there is provided a hybrid electric power device for a crane including an engine generator; an electric power accumulating unit; and a control unit including an electric power load calculating part configured to calculate an electric power loaded on the engine based on electric power required from an outside load and charging electric power exerted by an electric power accumulating unit, and a command signal sending part configured to calculate output torque and a revolution speed based on the electric power loaded on an engine and sending a torque command signal indicative of the output torque to the engine generator and a revolution speed command signal indicative of the revolution speed to the engine generator.

According to a second aspect of the invention, there is provided the hybrid electric power device according to the first aspect wherein the engine generator includes an engine and a generator part capable of functioning as a generator and a motor that is connected to an output shaft of the engine, and when an increment rate of the required electric power exceeds a predetermined value, the generator part assists rotation of the engine by the generator part until the revolution speed of the engine reaches a predetermined revolution speed.

According to a third aspect of the invention, there is provided the hybrid electric power device according to the second aspect wherein a function of the generator part changes from the motor for assisting the rotation of the engine to the generator for generating electric power using the engine.

According to a fourth aspect of the invention, there is provided the hybrid electric power device according to the first to third aspects wherein the outside load includes a main unit and an assist unit, and the revolution speed of the engine where a main unit requiring power does not exist is lower than the revolution speed of the engine where the main unit requiring power exists.

According to a fifth aspect of the invention, there is provided the hybrid electric power device according to the first to fourth aspects wherein the engine generator includes an engine including an engine body and an engine control part for controlling activation of the engine body, and a generator unit including a generator part capable of functioning as a generator and a motor that is connected to an output shaft of the engine and a generator control part for controlling activation of the generator part, and the command signal sending part sends the revolution speed command signal containing information indicative of the revolution speed of the engine to the engine control part and sends the torque command signal indicative of torque to be generated in the generator part of the generator unit to the generator control part.

According to a sixth aspect of the invention, there is provided the hybrid electric power device according to the fifth aspect wherein the command signal sending part calculates time variation data of the revolution speed for accelerating the generator part of the generator unit so that the revolution speed of the engine corresponding to the electric power load on the engine satisfying a maximum electric power value of the required electric power is attained when an increment rate of the required electric power exceeds a predetermined value before the required electric power reaches the maximum electric power value, and sends the revolution speed command signal generated based on the time variation data of the revolution speed to the engine control part and the generator control part.

According to a seventh aspect of the invention, there is provided the hybrid electric power device according to the first to fourth aspects wherein the engine generator includes an engine including an engine body and an engine control part for controlling activation of the engine body, and a generator unit including a generator part capable of functioning as a generator and a motor that is connected to an output shaft of the engine and a generator control part for controlling activation of the generator part, and the command signal sending part of the control unit sends the torque command signal containing information indicative of an output torque of the engine to the engine generator and a revolution speed command signal indicative of the revolution speed, and sends the revolution speed command signal containing information indicative of the revolution speed of the generator part of the generator unit to the generator control part.

According to an eighth aspect of the invention, there is provided the hybrid electric power device according to the seventh aspect wherein the command signal sending part calculates time variation data of the revolution speed for accelerating the generator part of the generator unit so that the revolution speed of the engine corresponding to the electric power load on the engine satisfying a maximum electric power value of the required electric power is attained when an increment rate of the required electric power exceeds a predetermined value before the required electric power reaches the maximum electric power value, sends the revolution speed command signal generated based on the time variation data of the revolution speed to the generator control part, and calculates the output torque enabling acceleration of the generator part while avoiding a combustion state of the engine from degrading during an acceleration period of the generator part, and sends the torque command signal generated based on the output torque to the engine control part.

According to a ninth aspect of the invention, there is provided the hybrid electric power device according to the first to eighth aspects wherein the control unit controls the engine generator so that the engine is driven by the generator part in an electrically motive state.

According to a tenth aspect of the invention, there is provided a control method for a hybrid electric power device for a crane including an engine generator and an electric power accumulating unit, the control method including calculating an electric power loaded on the engine generator based on electric power required from an outside load and charging electric power exerted by the electric power accumulating unit; calculating output torque and a revolution speed based on the electric power loaded on an engine; and sending a torque command signal indicative of the output torque to the engine generator and a revolution speed command signal indicative of the revolution speed to the engine generator.

According to an eleventh aspect of the invention, there is provided the control method according to the tenth aspect, wherein the engine generator includes an engine and a generator part capable of functioning as a generator and a motor that is connected to an output shaft of the engine, and when an increment rate of the required electric power exceeds a predetermined value, the generator part assists rotation of the engine by the generator part until the revolution speed of the engine reaches a predetermined revolution speed.

According to a twelfth aspect of the invention, there is provided the control method according to the eleventh aspect, wherein a function of the generator part changes from the motor for assisting the rotation of the engine to the generator for generating electric power using the engine.

According to a thirteenth aspect of the invention, there is provided the control method according to the tenth to twelfth aspects, wherein the outside load includes a main unit and an assist unit, and the engine is controlled such that the revolution speed of the engine where a main unit requiring power does not exist is lower than the revolution speed of the engine where the main unit requiring power exists.

According to a fourteenth aspect of the invention, there is provided the control method according to the tenth to thirteenth aspects, wherein the engine generator includes an engine and a generator unit including a generator part capable of functioning as a generator and a motor that is connected to an output shaft of the engine, and the revolution speed of the engine and torque to be generated in the generator unit are controlled to adjust electric power generated by the engine generator.

According to a fifteenth aspect of the invention, there is provided the control method according to the fourteenth aspect, wherein when an increment rate of the required electric power exceeds a predetermined value, the engine is accelerated by functioning a speed regulator so that a revolution speed of the engine with which electric power loaded on the engine corresponding to a maximum electric power value of the required electric power is attained before the required electric power reaches the maximum electric power value, and the generator part of the generator unit is accelerated at a same speed as the revolution speed of the engine.

According to a sixteenth aspect of the invention, there is provided the control method according to the tenth to thirteenth aspects, wherein the engine generator includes an engine and a generator unit including a generator part capable of functioning as a generator and a motor that is connected to an output shaft of the engine, and the electric power generated by the engine generator is adjusted by controlling the output torque of the engine and a revolution speed of the generator part of the generator unit.

According to a seventeenth aspect of the invention, there is provided the control method according to the sixteenth aspect, wherein when an increment rate of the required electric power exceeds a predetermined value, the engine is controlled to generate the output torque to an extent of not degrading a combustion state of the engine, and the generator part of the generator unit is accelerated so that a revolution speed of the engine with which electric power loaded on the engine corresponding to a maximum electric power value of the required electric power is attained before the required electric power reaches the maximum electric power value.

According to an eighteenth aspect of the invention, there is provided the control method according to the tenth to seventeenth aspects, wherein when the electric power is supplied from an outside the engine is driven by the generator part of the generator unit in an electrically motive state.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

A description is given below, with reference to the FIG. 1 through FIG. 9 of embodiments of the present invention.

Reference symbols typically designate as follows:
1: hybrid electric power device for crane;
2: control unit;
2a: electric power load calculating part;
2b: command signal sending part;
10: engine generator;
20: engine;
21: engine body;
22: engine control part;
30: generator unit;
31: generator part;
32: generator control part; and
40: electric power accumulating unit.

The hybrid electric power device for the crane of the embodiment of the present invention is used in machineries such as a yard gantry crane of a rubber tired type and a jib crane mounted with tires. The hybrid electric power device for the crane includes an engine generator and an electric power accumulating unit to thereby supply electric power to a working actuator such as a winch and a transversely running apparatus and drive the engine generator in a state of good fuel consumption regardless of a variation of a load by properly controlling the operation of the engine generator.

Before explaining the hybrid electric power device 1 for the crane of an embodiment of the present invention, a structure of a crane in which the hybrid electric power device 1 for the crane of an embodiment is provided is briefly explained using a portal crane as an example.

Figure 9:
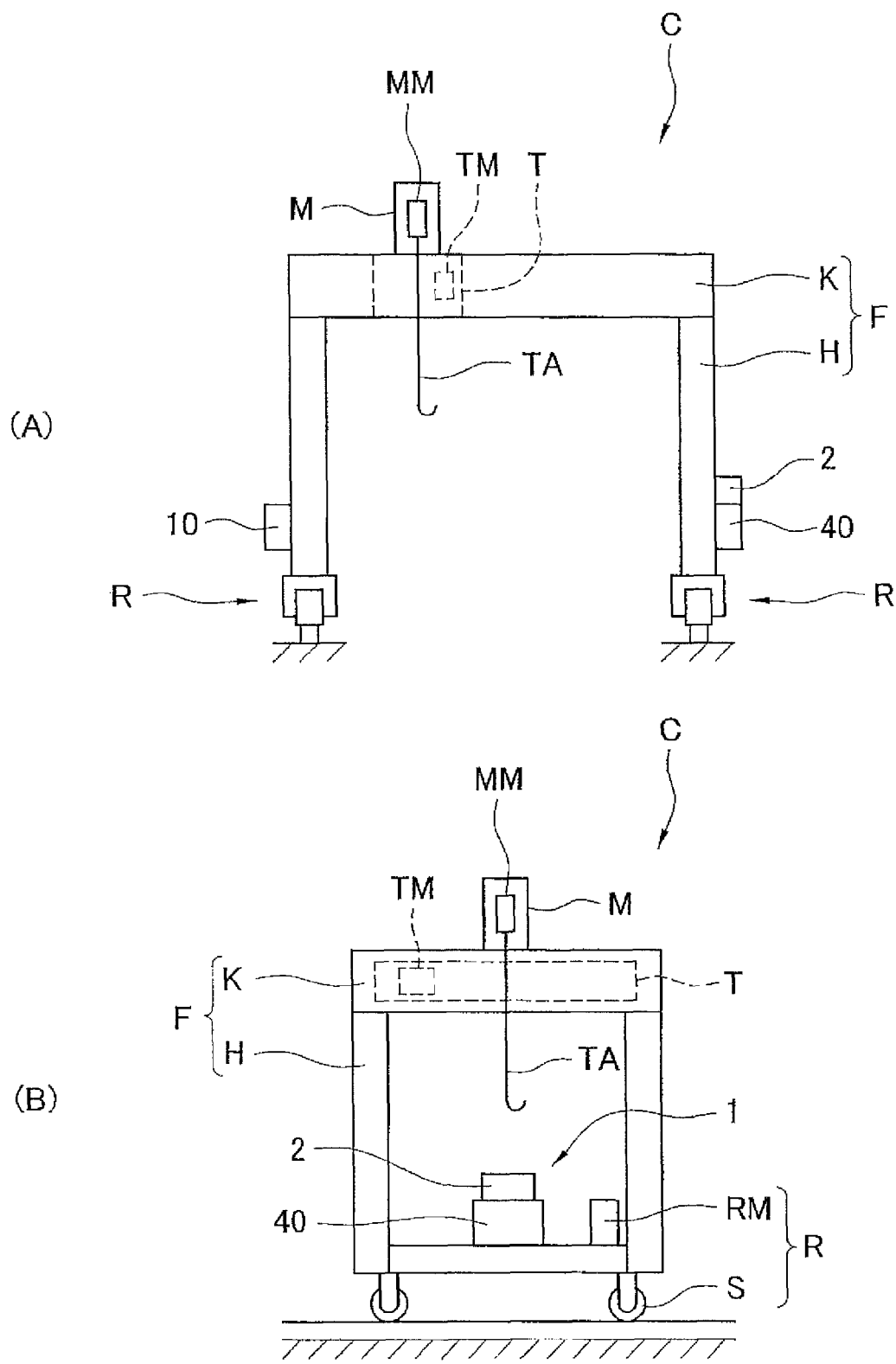
FIG. 9 are schematic views of a portal crane C in which the hybrid electric power device 1 for the crane is installed of the embodiment, wherein a front view of the portal crane is illustrated in (A) and a side view of the portal crane is illustrated in (B).

Referring to FIG. 9, a reference symbol C designates the portal crane. Referring to FIG. 9, (A) is a front view of the portal crane C, and (B) is a side view of the portal crane C. The portal crane C includes a portal frame F including a beam K and pillars H supporting the beam K and a pair of traveling sections provided at lower ends of the pillars H of the frame F.

The travelling sections R, R include wheels S and a travelling motor RM. By driving the travelling motors RM, the portal crane C can be moved.

Meanwhile, a trolley T running on the beam K of the frame F is provided. The trolley T includes a transversely running motor TM for transversely moving the trolley T and a hoisting machine M for pulling up a cargo. The hoisting machine M includes a hoisting motor MM for winding up and feeding the wire to which a hoisting attachment TA such as a hook for suspending a cargo at the end of wire is attached.

The hybrid electric power device 1 for the crane for supplying electricity to a travelling motor RM, a transversely running motor TM and the hoisting motor MM is provided in the frame F.

Figure 1:
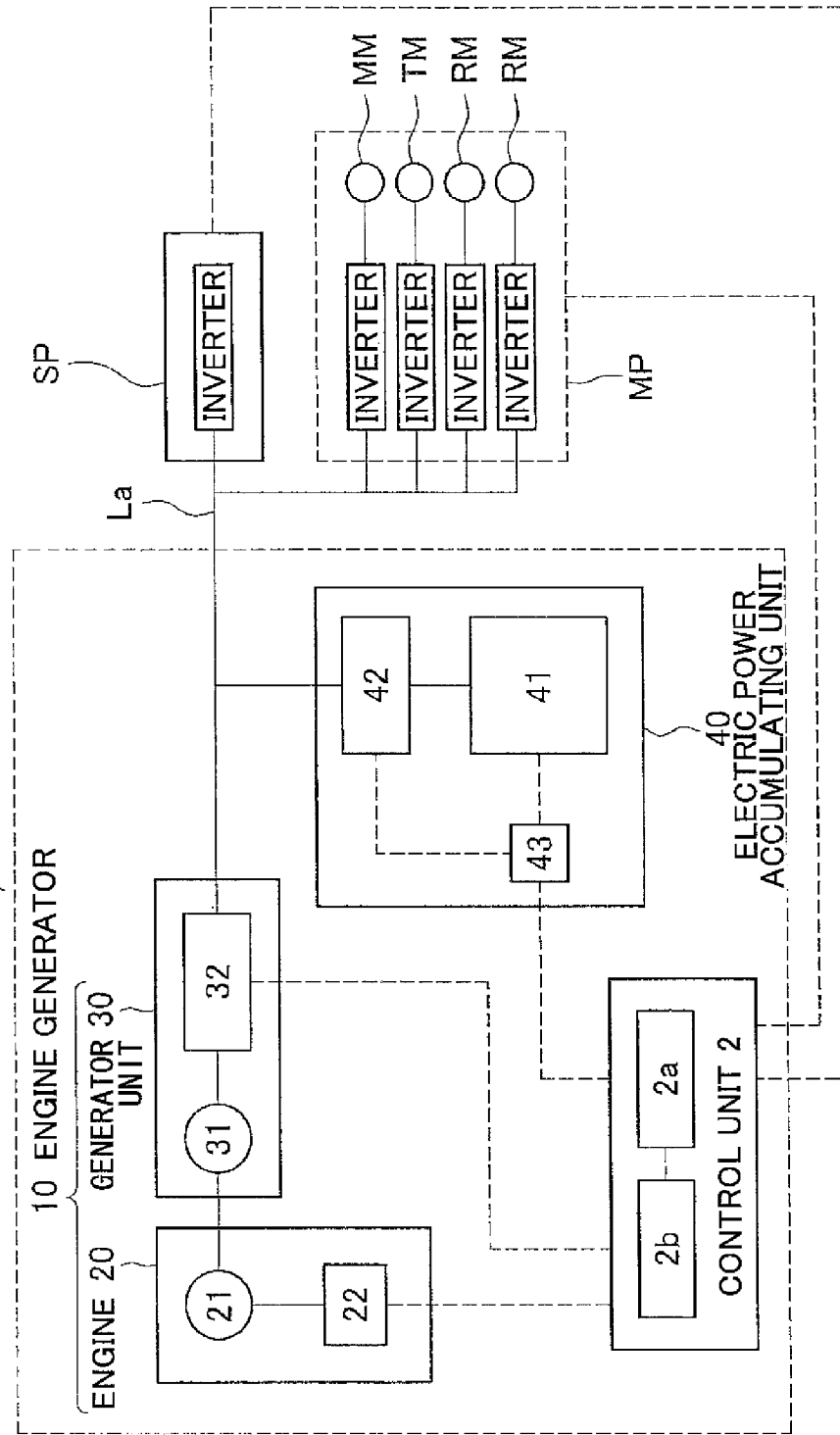
FIG. 1 is a block chart illustrating a schematic structure of a hybrid electric power device 1 for a crane of an embodiment.

Then, the hybrid electric power device 1 for the crane is described next. Referring to FIG. 1, a reference symbol MP designates a main unit of the portal crane C or the like of the embodiment (hereinafter, the portal crane C or the like is referred to as crane equipment). The main unit MP includes the travelling motor RM of the above traveling section R, a transversely running motor TM of the trolley T, and a working actuator such as the hoisting motor MM of the portal crane C.

Referring to FIG. 1, the reference symbol SP designates a device (an assist unit) other than the main unit MP in the crane equipment. The assist unit SP is other than the main unit MP in the crane equipment, for example, a control electric power, a power source for illumination and security, an ancillary electric motor or the like.

Each motor included in the main unit MP has an inverter for controlling the alternating-current (AC) power supplied to the motors. The assist unit SP includes an assist unit inverter for controlling the AC power supplied to the assist unit SP. Because the assist unit SP is connected to a direct current bus bar La described later, there is a probability that the AC power supplied from the direct current bus bar La varies depending on the voltage variation if the engine generator. However, because the assist unit SP is connected to the direct current bus bar La via the assist inverter, the AC power supplied to the assist unit SP is controlled to have a stable voltage by the assist unit inverter. The main unit MP and the assist unit SP are outside loads.

Referring to FIG. 1, the reference symbol La designates the direct current bus bar for supplying the direct current to the outside from the hybrid electric power device 1 for the crane. The direct current bus bar La is connected to the main unit MP and the assist unit SP to which the electric power is supplied from the hybrid electric power device 1 for the crane.

The electric power regenerated by the motors of the main unit is supplied to the assist unit SP and the hybrid electric power device 1 for the crane via the direct current bus bar La. The direct current bus bar La is adjusted to have a predetermined operation voltage for the hybrid electric power device 1 for the crane while the crane equipment is operating.

(Explanation of the Structure of the Hybrid Electric Power Device 1 for the Crane)

Referring to FIG. 1, the hybrid electric power device 1 for the crane includes an engine generator 10, an electric power accumulating unit 40, an engine generator 10, and a control unit 2 for controlling operation of the electric power accumulating unit 40.

(Explanation of the Engine Generator 10)

The engine generator 10 includes an engine 20 and a generator unit 30 including a generator part 31 connected to an output shaft of the engine 20.

(Explanation of the Engine 20)

The engine 20 is a diesel engine provided with a supercharging mechanism such as a turbo charger. The engine 20 includes an engine body 21 and an engine control part 22 for controlling active operation of the engine body 21. The engine control part 22 controls an operating state of the engine body 21 based on a command from the control unit 2.

The engine 20 is not limited to the diesel engine provided with the supercharging mechanism such as the turbo charger and may be a diesel engine without a supercharging mechanism.

(Explanation of the Generator Unit 30)

The generator unit 30 includes a generator part 31 and a generator control part 32 such as an inverter for controlling the operation of the generator part 31.

The generator part 31 is provided with, for example, a built-in magnet type synchronous motor (an IPM motor). However, the generator part 31 is not specifically limited as long as the function of the motor is provided in addition to the function of the generator part. The main shaft of the generator part 31 is directly connected to the output shaft of the engine 20. The generator part 31 is connected to the engine 20 so that the revolution speed of the generator part 31 and the revolution speed of the output shaft of the engine 20 constantly become the same or constantly have a predetermined ratio. The generator control part 32 has functions of controlling the operation of the generator part 31, for example functions of controlling torque generated in the generator part 31, the revolution speed of the generator part 31 and so on based on a command signal from the control unit 2. Specifically, the generator control part 32 controls so that the revolution speed and the generated torque of the generator part 31 match command values by determining the voltage and the frequency given to the generator part 31 based on a command sent from the control unit 2.

The generator control part 32 controls the torque generated in the generator part 31 and the revolution speed of the generator part 31 and so on thereby switching between a state of supplying the electric power generated by the generator part 31 to the direct current bus bar La and a state of operating the generator part 31 by receiving the supply of the electric power from the direct current bus bar La.

(Explanation of the Electric Power Accumulating Unit 40)

As illustrated in FIG. 1, an electric power accumulating unit 40 is connected to the direct current bus bar La so that the electric power accumulating unit 40 is arranged in parallel to the engine generator 10. The electric power accumulating unit 40 includes a buck-boost converter 42 and an electric power accumulator 41 such as a battery and a capacitor which can be charged and discharged. The electric power accumulator 41 is connected to the direct current bus bar La via the buck-boost converter 42. Said differently, the electric power accumulating unit 40 can supply the electric power from the electric power accumulator 41 to the main unit MP and the engine generator 10 via the buck-boost converter 42 and the direct current bus bar La. Meanwhile, the electric power from the main unit MP and the engine generator 10 can be charged to the electric power accumulator 41.

The electric power accumulating unit 40 includes the electric power control unit 43. The electric power control unit 43 has a function of monitoring a charger rate of the electric power accumulator 41 and a function for controlling operation of the buck-boost converter 42. The function for controlling the operation of the buck-boost converter 42 is to switch over boosting operation, bucking operation and cutoff operation based on an electric power command signal sent from the control unit 2.

The boosting operation is to boost the voltage of the direct electric power (hereinafter, referred to as the voltage on the electric power accumulator side) supplied from the electric power accumulator and output the boosted direct electric power to the direct current bus bar La for a predetermined time period at a predetermined timing.

The bucking operation is to buck the voltage of the direct current bus bar La and supply the electric power from the direct current bus bar La to the electric power accumulator 41. The cutoff operation is to electrically cut off a connection between the electric power accumulator 41 and the direct current bus bar La.

Since the electric power accumulating unit 40 is structured as described above, if the buck-boost converter 42 is controlled to do the boosting operation, it is possible to supply a direct-current (DC) power having a predetermined amount of voltage higher than the voltage on the side of the electric power accumulator from the electric power accumulator 41 to the direct current bus bar La at a predetermined timing. Said differently this direct current can be supplied for a predetermined time.

Meanwhile, if the buck-boost converter 42 is controlled to do the bucking operation, it is possible to output the electric power from the direct current bus bar La to the side of the electric power accumulator 41. Therefore, the electric power accumulator 41 can be charged by supplying the direct electric power to the electric power accumulator 41.

The electric power control unit 43 ordinarily controls the voltage of the direct current bus bar La so as to maintain a predetermined operation voltage. Said differently, if the voltage of the direct current bus bar La becomes higher than a predetermined operation voltage, the electric power accumulator 41 is charged. On the contrary, if the voltage of the direct current bus bar La becomes lower than a predetermined operation voltage, the electric power accumulator 41 supplies the electric power.

(Explanation of the Control Unit 2)

The control unit 2 controls operation of the above engine generator 10 and the operation of the electric power accumulating unit 40.

Information (input information) input into the control unit 2 is, for example, information related to operating states of the main unit MP and the assist unit SP, namely electric power (e.g., a current value) supplied to the main unit MP and the assist unit SP, battery information such as a charging rate, a battery current value, a battery voltage value and so on of the electric power accumulating unit 40, a current value supplied from the generator control part 32 to the direct current bus bar La, and an operating state of the engine 20 such as the revolution speed and the fuel injection amount. However, needless to say, the input information is not limited thereto.

The control unit 2 includes an electric power load calculating part 2a calculating electric power loaded on the engine generator 10 and the electric power accumulating unit 40 and a command signal sending part 2b generating a command signal sent to the engine generator 10 and send the command signal.

(Explanation of the Electric Power Load Calculating Part 2a)

The electric power load calculating part 2a has a function of calculating all electric power which should be supplied to the direct current bus bar La from the engine generator 10 and the electric power generator 40. Said differently, there is a function of calculating the direct electric power (hereinafter, referred to as required electric power) which should be supplied from the engine generator 10 and the electric power accumulating unit 40 to the direct current bus bar La. Specifically, the required electric power is a sum of electric power (electric power required for main unit) required for activating the motors of the main unit MP, electric power (assisting required electric power required for assisting) for the hybrid electric power device 1 for the crane, and power (electric power required for assist unit) required for operating the assist unit SP.

The electric power load calculating part 2a has a function of calculating direct electric power (hereinafter, referred to as outside electric power) supplied from the main unit MP to the direct current bus bar La while the main unit MP generates, said differently, the electric power input in the hybrid electric power device 1 for the crane.

The electric power load calculating part 2a has a function of determining a loading ratio of electric power loaded on the engine generator 10 and the electric power accumulator 41 of the electric power accumulating unit 40 based on the required electric power and the charging rate of the electric power accumulator 41 or the like. The electric power load calculating part 2a further has functions of sending an electric power command signal including information related to the loading ratio including information of electric power (electric power loaded on the engine) loaded on the engine generator 10 to the command signal sending part 2b and of sending an electric power command signal including information related to the loading ratio including information of electric power (electric power loaded on the electric power accumulator) loaded on the electric power accumulating unit 40 to the electric power control unit 43.

The loading ratio loaded in the engine generator 10 and the electric power accumulating unit 40 may be appropriately set. For example, the loading ratio may be 50% to 50% (1:1) if the main unit MP is in an ordinary operation state. If the charging rate of the electric power accumulator 41 is high, the loading ratio of the electric power accumulator 41 may be increased to thereby decrease the load on the engine generator 10. In this case, because the load on the engine generator is decreased, the engine generator 10 may carry out an energy saving operation. On the other hand, if the charging rate of the electric power accumulator 41 is low, the loading ratio of the electric power accumulator 41 may be decreased to thereby operate the engine generator 10 so as to prevent the charging rate of the electric power accumulating unit 40 from decreasing. As described, the electric power load calculating part 2a calculates the electric power loaded on the engine based on the required electric power from the outside load and the charging electric power for the electric power accumulating unit 40.

When it is detected by the electric power load calculating part 2a that the required electric power suddenly increases, the electric power load calculating part 2a can also calculate a level of the maximum electric power required in the future (a predicted maximum electric power) and the timing of requirements of the predicted maximum electric power.

A case where the required electric power suddenly increases is, for example, when starting to wind up a rope in a crane. A method for detecting the sudden increment of the required electric power is not specifically limited. For example, when the crane is wound up it is possible, by detecting how levers and so on for operating a hoisting machine are operated and by detecting an increment rate of electric power specifically generated in starting to wind the crane, to predict the maximum electric power.

The predicted maximum electric power can be calculated by previously input data of a cargo hoisted up or can be predicted by previously testing the hoist of the cargo by the crane and correcting data of the test. However, the method of obtaining the predicted maximum electric power is not specifically limited.

(Explanation of the Command Signal Sending Part 2b)

The command signal sending part 2b has functions of generating a signal indicative of the operating state based on an electric power loaded on the engine calculated by the above electric power load calculating part 2a and sending the generated signal. The signal indicative of the operating state is a torque command signal indicative of the torque generated by the engine generator 10, a revolution speed command signal indicative of the revolution speed of the engine generator 10 or the like.

In order to generate the torque command signal and the revolution speed command signal, the command signal sending part 2b has a function of calculating an output torque and a revolution speed for generating electricity while maintaining a good fuel consumption relative to the electric power loaded on the engine. Although a method of calculating the output torque and the revolution speed by the functions is not specifically limited, for example, there is a method of calculating the output torque and the revolution speed based on a correlation (map) indicative of a relationship between the electric power and the output torque of the engine generator enabling generation of the electric power with the smallest fuel consumption and a map indicative of a relationship between the output torque of the engine generator 10 and the revolution speed and a fuel supply amount (an amount of fuel injection) enabling output of the output torque with the smallest fuel consumption or the like.

Figure 7:
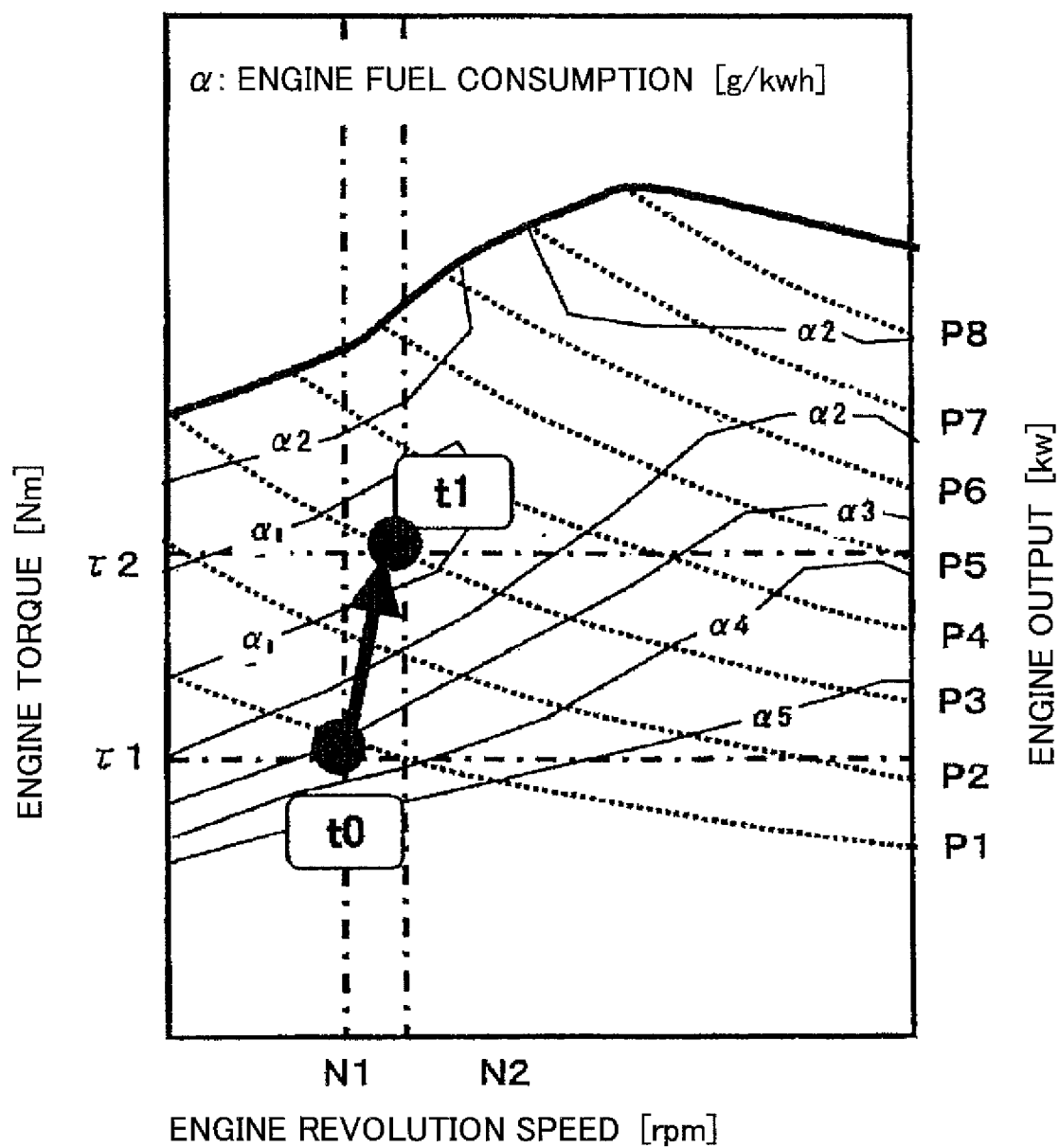
FIG. 7 is an exemplary characteristic graph of an engine 20 of an engine generator.

An example of the map used for calculating the output torque and the revolution speed of the engine generator 10 is illustrated in FIG. 7. FIG. 7 is a characteristic diagram of the engine generator 10. Referring to FIG. 7, the right axis of abscissa designates the engine torque, the left axis of abscissa designates the engine output, dotted lines designate equal output lines P1 to P8, and solid lines designate equal fuel consumption lines α1 to α5. Outputs of the equal output lines increase from P1 to P8, and fuel consumptions of the equal fuel consumption lines decrease from α5 to α1. The bold solid line illustrates the maximum torque line indicative of the capability of the engine output.

By using the map with reference to the electric power loaded on an engine, it is possible to obtain the engine torque and the engine revolution speed with which the electricity is generated while maintaining the smallest fuel consumption. Said differently, if the required electric power loaded on an engine is P3, the fuel consumption changes from α1 or less to α5 or more depending on the revolution speed of the engine. If the engine revolution speed is selected so that a cross point between the engine torque and the revolution speed of the engine is positioned inside a region surrounded by α1 (for example, a state t1 in which the engine torque is τ2 and the revolution speed is N2), the electricity can be generated with good fuel consumption. By selecting the engine torque and the revolution speed of the engine so that the cross point between the engine torque and the revolution speed of the engine is positioned in a region where the fuel consumption becomes the smallest, it is possible to generate electricity while making the fuel consumption small.

The information from the various units is input into the control unit 2. The control unit 2 controls the operations of the engine generator 10 and the electric power accumulating unit 40 by sending command signals to the engine generator 10 and the electric power accumulating unit 40 based on the input information.

The command signal sending part 2b controls an ordinary operation mode under an ordinary operation, and has a function for controlling with an acceleration mode when the required electric power suddenly increases.

In the ordinary operation, the engine generator 10 is controlled to have the output torque and the revolution speed enabling generation of electricity while the fuel consumption is low based on the electric power loaded on the engine.

In the acceleration mode, the revolution speed of the engine generator 10 is controlled to reach a revolution speed (a target revolution speed) enabling the most efficient generation of the electric power loaded on the engine with the engine generator 10 before a timing (a prediction timing) reaches the predicted maximum electric power when the required electric power required by the main unit MP suddenly increases.

In order to control as described above in the acceleration mode, the command signal part 2b produces time variation data of the revolution speed and generates the revolution speed command signal based on the time variation data of the revolution speed and sends the generated signal. The time variation data of the revolution speed are used to increase the revolution speed of the engine generator 10 until the revolution speed reaches the target revolution speed. For example, the time variation data of the revolution speed are data indicating a rate of the time variation, data indicating revolution speeds for predetermined time intervals, and so on. However, the time variation data are not specifically limited.

The method of producing the time variation data of the revolution speed is not specifically limited. It is possible to adopt a method of selecting appropriate data from the time variation data of plural revolution speeds stored in the command signal sending part 2b based on a difference between the present revolution speed and the target revolution speed for a period between the present time and the predicted timing. It is also possible to adopt a method of producing the time variation data of the revolution speed using ramp function based on a time period between the present time and the prediction timing, the present revolution speed, the target revolution speed and the like.

The target revolution speed may be a revolution speed for generating a rated output of the engine generator 10 irrespective of a value of the predicted maximum electric power. In this case, even though the actual maximum power exceeds the predicted maximum electric power or the load suddenly increases from a time when the predicted maximum electric power is calculated, it is possible to prevent the electric power supplied from the engine generator 10 from running short. If the electric power load calculating part 2a does not have a function of calculating a prediction timing, the target revolution speed is rendered to be a revolution speed generating the rated output of the motor generator 10 to thereby prevent the electric power from running short.

The method of calculating the prediction timing is not specifically limited. For example, by previously input data of a cargo to be hoisted up, the prediction timing can be calculated based on the weight of the cargo and an increment rate of the electric power, or by previously testing to hoist up the cargo by a crane, the prediction timing can be estimated based on the data. Thus, the method is not specifically limited.

Further, if an electric power load calculating part 2a does not have a function of calculating the prediction timing, the revolution speed command signal may be formed to reach the target revolution speed after a passage of the predetermined period after detecting a sudden increment of the required electric power. For example, in a case of a diesel engine provided with a supercharging mechanism such as a turbo charger, the revolution speed command signal may be formed so as to reach the target revolution speed within a time period of about 0.5 second in consideration of a time lag (e.g., 3 to 4 seconds) between initiation of acceleration and an activation of the supercharging mechanism.

Further, the command signal sending part 2b has a function for controlling in the regeneration mode when the main unit MP carries out the regeneration operation.

The regeneration mode is a control mode of operating the engine 20 of the engine generator 10 as a means for consuming energy.

In order to carry out the control in the regeneration mode as described above, the command signal sending part 2b of the control unit 2 has a function of producing a revolution speed command signal indicative of the revolution speed of the engine 20 and a revolution speed command signal of the generator part indicative of the revolution speed of the generator part 31 of the generator unit.

With this function, the revolution speed command signal of the engine 20 is produced so that the engine 20 operates at an idling speed, and the revolution speed command signal of the generator part 31 is produced so that the generator part 31 operates at a speed of the idling speed+$\alpha$. With this, the engine functions as the load consuming the energy.

The revolution speed of the revolution speed command signal of the engine may be slightly slower than the revolution speed of the revolution speed command signal of the generator part irrespective of the above mentioned revolution speeds.

(Explanation of the Structure of the Hybrid Electric Power Device for the Crane)

The operation of the hybrid electric power device for the crane having the above mentioned structure is described.

Figure 2:
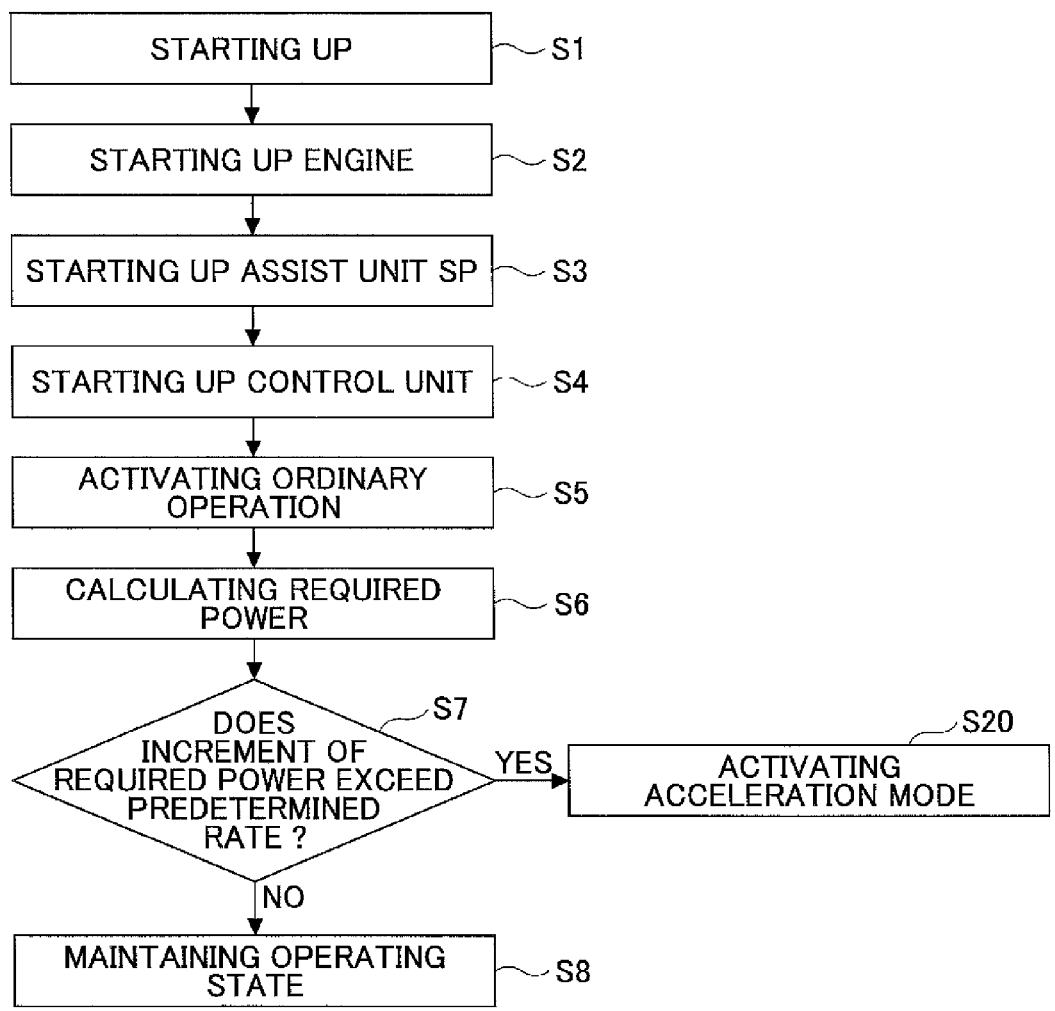
FIG. 2 is a flow chart illustrating starting-up operation and ordinary operation of the hybrid electric power device 1 for the crane of the embodiment.

(1) Explanation of Starting-Up of the Hybrid Electric Power Device 1 for the Crane The starting-up of the hybrid electric power device 1 for the crane is described based on FIG. 2.

1) Starting Up the Engine 20

The hybrid electric power device 1 for the crane is started up by a start-up switch or the like in step S1. Then, the engine 20 of the engine generator 10 is started in step S2. The control unit 2 is prevented from starting up at a time of starting up the hybrid electric power device 1.

The started-up engine 20 is controlled so that the engine body 21 is maintained in the idling state by the engine control part 22. Said differently, the revolution speed of the engine body 21 is increased to reach the idling speed.

2) Starting Up the Assist Unit Sp

When the engine 20 of the engine generator 10 is started-up, the generating part 31 of the generator unit 30 starts to generate electricity. When the voltage of the direct current bus bar La is maintained to be a minimum operation voltage with which the assist unit SP is operable by the electric power supplied from the generator part 31, the inverter inside the assist unit SP is started up in step S3.

If the generator control part 32 includes an inverter, the electric power generated by the generator part 31 undergoes three-phase full-wave rectification by a diode bridge of the inverter. The rectified electric power is used to charge the condenser of the inverter connected to the direct current bus bar La.

If the generator part 31 of the generator unit 30 is an ordinary generator having field winding, in order to prevent a problem caused by a sudden increment of the electric current supplied to the direct current bus bar La, it is necessary to provide a function of restricting an initial charge current in the generator control part 32. On the other hand, if an IPM motor is used as the generator part 31, the generating voltage of the generator part 31 increases as the revolution speed of the engine body 21 increases. Therefore, there is an advantage that the function of restricting an initial charge current in the generator control part 32 can be omitted.

3) Starting Up the Control Unit 2

When the inverter inside the assist unit SP starts up, the electric power necessary for controlling the hybrid electric power device 1 for the crane is obtained. Therefore, the control unit 2 of the hybrid electric power device 1 for the crane is started up and the hybrid electric power device 1 for the crane is operated in step S4.

The engine generator 10 and the electric power accumulating unit 40 are controlled by the started-up control unit 2. The direct current bus bar La is maintained to have a predetermined operation voltage by the electric power supplied from both the engine generator 10 and the electric power accumulating unit 40. Then, the hybrid electric power device 1 for the crane is completely started up and the main unit MP can be operated. Said differently, the crane equipment becomes operable.

The operation voltage of the direct current bus bar La is set higher than the maximum value of a voltage to be supplied to the outside by ordinary generation by the generator part 31 in order to prevent the electric power (an amount of the electric current) supplied from the engine generator 10 to the direct current bus bar La from becoming uncontrollable. The electric power may not be supplied to the direct current bus bar La by the ordinary generation of the electric power by the generator part 31. However, in the hybrid electric power device 1 for the crane of the embodiment, the generator control part 32 controls the generator part 31 to be in a regenerative braking state to enable supplying the electric power from the generator part 31 to the direct current bus bar La.

If an electric power supplying means is provided to supply electric power necessary to control the hybrid electric power device 1 for the crane in addition to the inverter in the assist unit SP, the hybrid electric power device 1 for the crane may be started up before starting up the inverter in the assist unit SP.

(2) Operating the Crane Equipment

In the hybrid electric power device 1 for the crane of the embodiment, the operation is changed in response to an operating condition of the main unit MP, namely the electric power required by the main unit MP, while the crane equipment is operating. Specifically, the following states are structured to operate with appropriate conditions:

1) Waiting state;
2) Ordinary operation state;
3) Sudden increment of the required electric power for the main unit MP; and
4) Regeneration operation of the main unit MP.

Next, operations of the hybrid electric power device 1 for the crane of the embodiment in the states 1) to 4) are described.

When the control unit 2 sends the revolution speed command signal to the engine control part 22, the torque command signal is sent to the generator control part 32. On the contrary, when the torque command signal is sent to the engine control part 22, the revolution speed command signal is sent to the generator control part 32.

Therefore, a case where the revolution speed command signal is sent from the engine control part 22 to the control unit 2, and the torque command signal is sent to the generator control part 32 is described as a first embodiment.

First Embodiment

1) Waiting State

While all of the motors in the main unit MP are not operated (the waiting state), the electric power is consumed only by the hybrid electric power device 1 for the crane and the assist unit SP. In this case, the electric power necessary for operating the hybrid electric power device 1 for the crane and the assist unit SP and the electric power enabled to maintain the direct current bus bar La to have the operation voltage is supplied to the direct current bus bar La. Under the state, the electric power necessary for operating the hybrid electric power device 1 for the crane and the assist unit SP is controlled to be mostly supplied from the engine generator 1.

Meanwhile, in the waiting state, the electric power accumulating unit 40 operates the electric power accumulator 41 by charging and discharging the electric power accumulator 41 to maintain the voltage of the direct current bus bar La to be the operation voltage. Therefore, the charging rate of the electric power accumulator 41 increases and decreases along with the charge and discharge.

Therefore, if the charging rate of the electric power accumulating unit 40 becomes a predetermined value or less, the control unit 2 controls the engine generator 10 to supply the electric power charging the electric power accumulating unit 40 in addition to the electric power necessary for operating the hybrid electric power source device 1 for the crane and so on. Said differently, the control unit 2 sends the revolution speed command signal and the torque command signal so that the engine generator 10 is operated at the revolution speed for generating the electric power as much as the sum of the electric power necessary for operating the hybrid electric power source device 1 for the crane and so on and the electric power necessary for charging the electric power accumulating unit 40. The engine generator 10 operates accordingly. When the charging rate of the electric power accumulator 41 is recovered to a predetermined charging rate or more, the engine generator 10 is returned to an original operating state.

On the contrary, if the charging rate increases, the engine generator 10 is controlled so that the electric power supplied from the engine generator 10 to the direct current bus bar La becomes smaller than the electric power necessary for operating the hybrid electric power source device 1. Thus, the electric power accumulator 41 discharges electricity to recover the predetermined charging rate.

Said differently, the control unit 2 controls the charging rate of the electric power accumulator 41 to be in a predetermined range. The operating state of the engine generator 10 is appropriately changed to adjust the charging rate of the electric power accumulator 41 in response to the charging rate of the electric power accumulator 41.

When the main unit MP is not operated (in the waiting state), the electric power required by the main unit MP is small. Therefore, it is preferable to control the engine generator 10 to be in an operating state in which the highest electric power generating efficiency among all operating states is obtained, namely the operation state in which the smallest fuel consumption is obtained. In this case, it is possible to suppress the fuel consumption of the engine generator 10 to thereby maintain the operation efficiency of the hybrid electric power device 1 for the crane at a high level.

2) Ordinary Operation State (Step S5)

Referring to FIG. 2, the ordinary operation of the hybrid electric power device 1 for the crane is described.

For ease of explanation, the ordinary operation of the hybrid electric power device 1 is compared to an ordinary operation in a portal crane illustrated in FIG. 9.

Although the voltage of the required electric power varies in the ordinary operation, the rate of the variation, namely an increment rate and a decrement rate of the required voltage are small. For example, in the portal crane illustrated in FIG. 9 or the like, the hoisting motor MM does not operate. However, a travelling motor RM and a transversely running motor TM are driven.

In the ordinary operation state, the control unit 2 (e.g., the electric power load calculating part 2*a*) calculates electric power necessary for inverters included in the various motors of the main unit MP (specifically, an inverter for travelling, an inverter for transversely running, an inverter for assist unit and an inverter for hoisting). Thus, the required electric power for the main unit MP is calculated in step S6.

Then, the control unit 2 determines whether the increment rate of the required electric power exceeds a predetermined threshold value. If the increment rate does not exceed the threshold value, the control unit 2 determines that the main unit MP is in the ordinary operation state in step S7. Then, the control unit 2 controls to maintain the ordinary operation state in step S8.

In driving the travelling motor RM and the transversely running motor TM, because of inertia force of devices and units caused in driving the travelling motor RM and the transversely running motor TM is small, an increment rate of the required electric power does not ordinarily exceed a predetermined threshold value.

When it is determined that the hybrid electric power device 1 for the crane is in the ordinary operation state, the electric power to be loaded on the engine generator 10 and the electric power accumulating unit 40 is calculated by the electric power load calculating part 2*a* of the control unit 2. Then, the command signal sending part 2*b* calculates the output torque and the revolution speed, by which electricity is generated with the small fuel consumption, relative to and based on the electric power loaded on the engine. Then, the revolution speed command signal containing information of the calculated revolution speed and a torque command signal containing information of the calculated output torque are generated and sent respectively to the engine control part 22 and the generator control part 32. At the same time, the electric power load calculating part 2*a* sends the electric power command signal containing information of the electric power to be loaded on the electric power accumulator to the electric power control unit 43.

The engine control part 22 of the engine 20 controls the engine body 21 so as to maintain the revolution speed of the engine 20 based on a command for the revolution speed contained in the revolution speed command signal. Specifically, the engine body 21 is controlled so as to maintain the above revolution speed using a speed regulator (hereinafter, simply referred to as a governor).

On the other hand, the generator control part 32 of the generator unit 30 is controlled so that the generator part 31 generates the torque indicated by the torque command signal. The torque of the generator part 31 is controlled so that the generator part 31 generates the electric power loaded on the engine at the above revolution speed. Then, the electric power corresponding to the revolution speed of the engine 20 and the torque of the generator part 31 is generated and the electric power corresponding to the indicated electric power loaded on the engine is supplied to the direct current bus bar La.

The electric power to be loaded on the electric power accumulating unit 40 is supplied to the direct current bus bar La based on the electric power supplying instruction.

Therefore, the predetermined electric power can be supplied from the engine generator 10 and the electric power accumulating unit 40 to the direct current bus bar La. Said differently, the required electric power can be supplied from the hybrid electric power device 1 for the crane to the main unit MP.

Furthermore, the fuel consumption of the engine generator 10 can be improved because the engine body 21 of the engine generator 10 is controlled to be in the operating state with which the engine generator 10 can most efficiently generate the electric power loaded on the engine.

The electric power load calculating part 2*a* of the control unit 2 constantly monitors the required electric power to change the electric power to be loaded on the engine generator 10 and the electric power accumulating unit 40 along with the variation of the required electric power. Then, the command signal sending part 2*b* changes the command signal sent to the engine generator 10. Therefore, even though the required electric power changes, the engine generator 10 can be controlled to be in the optimal operating state.

Referring to FIG. 7, an influence on the fuel consumption by the variations of the revolution speed of the engine and the engine torque in the ordinary operation is described. Referring to the characteristic graph of the engine illustrated in FIG. 7, the command signal sending part 2*b* may calculate the engine torque and the revolution speed of the engine. In this case, the engine generator 10 may be driven under conditions that the engine torque is $\tau 1$ and the revolution speed of the engine is N1, namely the required electric power is P1 or less at a point t0 in FIG. 7.

The electric power required by the main unit MP may increase from the conditions. In this case, if the electric power load calculating part 2*a* calculates the electric power loaded on the engine P3, the electric power command signal may be sent. After the electric power command signal is received by the command signal sending part 2*b*, the command signal sending part 2*b* can output the electric power loaded on the engine P3 based on the engine characteristic graph of FIG. 7 and can calculate a target revolution speed N2 and an engine torque $\tau 2$ at a cross point t1 in a region inside $\alpha 1$ where the fuel consumption is the smallest.

According to the instruction from the command signal sending part 2*b*, the operation of the engine generator 1 is changed so that the revolution speed of the engine is N2 and the engine torque is $\tau 2$, the engine generator 10 can output the electric power P3 loaded on the engine while the fuel consumption is the smallest.

2) Sudden Increment of the Required Electric Power for the Main Unit MP

Figure 3:
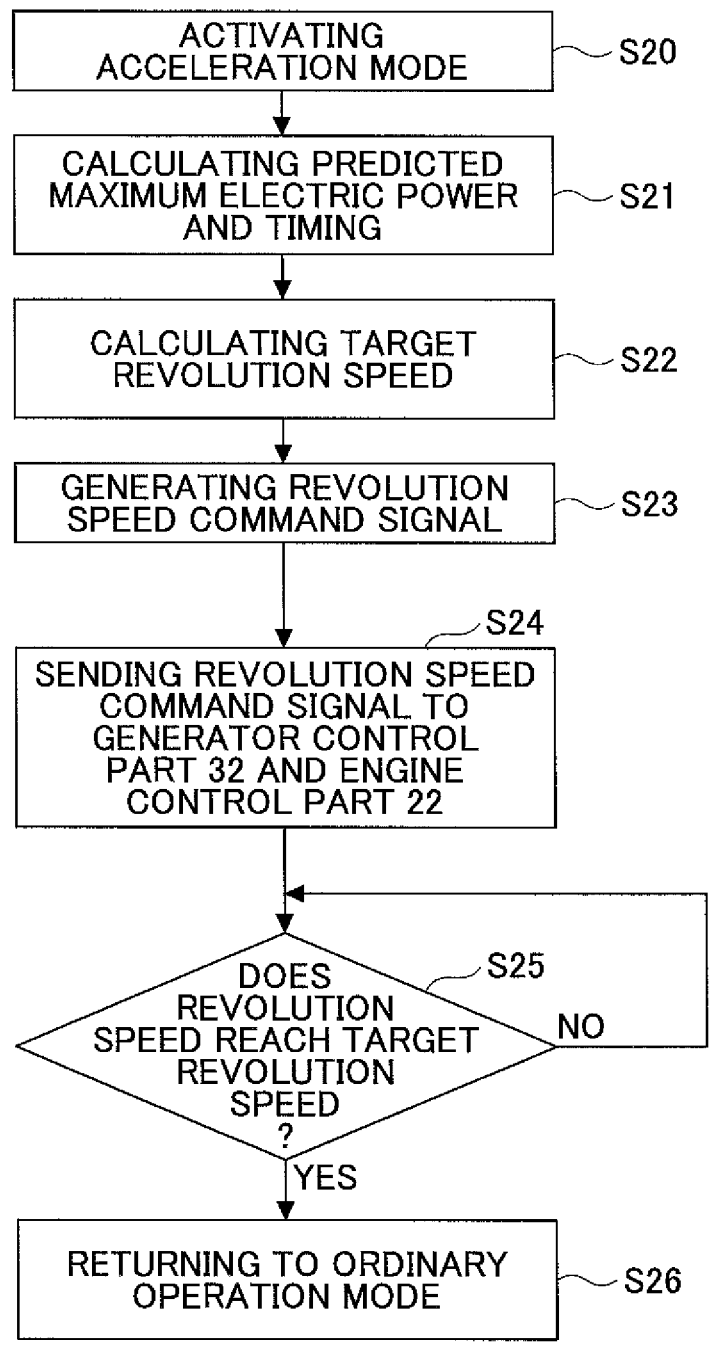
FIG. 3 is a flow chart of an operating state occurring when load suddenly increases while an engine 20 is controlled to rotate in consideration of a revolution speed.

The case where the required electric power for the main unit MP of the hybrid electric power device 1 for the crane suddenly increases is described based on FIG. 3.

For ease of explanation, the ordinary operation of the hybrid electric power device 1 is compared to an ordinary operation in the portal crane illustrated in FIG. 9.

When the hoisting motor MM is driven in the ordinary operation state or the waiting state so as to drive the hoisting motor, the control unit 2 calculates electric power required by the inverter of hoisting using the control unit 2 (electric power load calculating part 2*a*). In a manner similar to an ordinary operation state, the required electric power for the main unit MP is calculated to thereby determine whether the increment rate of the required electric power exceeds a predetermined threshold. Electric power required by the other inverters is also calculated.

In this, acceleration of a hoisting motion of the hoisting motor is unlike those in travelling and transversely running described above. Said differently, it is necessary to hoist up within a predetermined time. Therefore, a great amount of electric power needs to be supplied to the inverter for hoisting. Furthermore, the hoisting motor MM rotates a flywheel for hoisting a rope and so on. Therefore, a great inertia force has an influence on an overall hoisting mechanism. When the hoisting motor MM is driven, the increment rate of the required electric power exceeds a predetermined threshold value.

When the required electric power exceeds the predetermined threshold value, namely the required electric power suddenly increases, if the engine generator 10 is suddenly accelerated so as to follow the sudden increment of the required electric power, the combustion state of the engine generator is degraded. In the worst case, the engine stalls to thereby stop the entire system.

Therefore, in the hybrid electric power device 1 for the crane of the first embodiment, if the control unit 2 detects that the increment rate of the required electric power for the main unit MP exceeds a predetermined value, the engine generator 10 is structured to operate under an acceleration mode described later in order to prevent deterioration of the combustion state of the engine generator 10 (see FIG. 3).

When the control unit 2 detects that the increment rate of the required electric power for the main unit MP exceeds a predetermined value, a control in the acceleration mode is started in step S20. The electric power load calculating part 2a calculates predicted maximum electric power and a timing when the predicted maximum electric power is obtained in step S21. Then, the electric power loaded on the engine is calculated. When the calculated electric power loaded on the engine is sent to the command signal sending part 2b, the command signal sending part 2b calculates the revolution speed of the engine 20 with which the predicted maximum electric power is most efficiently output in step S22.

When the target revolution speed is calculated, a time variation data of the revolution speed is generated by the command signal sending part 2b in step S23. Based on the time variation data of the revolution speed, the revolution speed command signal is sequentially sent to the engine control part 22 of the engine generator 10 in step S24.

On the other hand, in the acceleration mode, the command signal sending part 2b sends a revolution speed command signal including the same information as the revolution speed command signal sent to the engine control part 22 to the generator control part 32 to which the torque command signal is sent in the ordinary operation in step S24.

As described, the revolution speed command signals containing the same information of the revolution speed are sent to both the engine control part 22 and the generator control part 32, the generator part 31 assists the engine 20 to increase the revolution speed of the engine. Thus, the acceleration period of the engine 20 is shortened while preventing degradation of the combustion state of the engine 20.

The reason why the degradation of the combustion state of the engine 20 can be prevented when the generator part 31 assists the increment of the revolution speed of the engine 20 is as follows.

When the revolution speed of the engine 20 is accelerated from the present revolution speed to the target revolution speed, the governor operates so as to increase the fuel supply amount to an extent of avoiding the degradation of the combustion state.

When the increment rate of the required revolution speed is high, even though the fuel supply amount is increased to the above described extent, the revolution speed of the engine 20 may not follow the required revolution speed. This is because responsivity of the engine 20 is low. More specifically, if the amount of injecting to the engine 20 becomes great, the air to be supplied is insufficient. Therefore, the engine may not accelerate.

Therefore, the revolution speed of the engine 20 is not sufficiently accelerated to thereby cause a delay in the acceleration. The governor is apt to supply a greater amount of the fuel to increase the revolution speed. In this case, the fuel is excessively supplied and therefore the combustion state is degraded. Under the state in which the revolution speed and a supercharging rate do not increase, the engine 20 may not generate a high output by a transient phenomenon. Therefore, if the load on the engine is excessively great, there is a probability that the engine 20 stalls.

If the generator part 31 is instructed to increase its revolution speed under the same condition as the engine 20, the revolution speed of the generator part 31 is accelerated in a required rate of increasing the revolution speed. Therefore, if there is a delay in the acceleration of the engine 20 and the acceleration of the generator part 31 is delayed, the generator control part 32 controls to increase the torque applied to the main shaft of the generator part 31 in order to accelerate the generator part 31 at the designated rate of increasing the revolution speed. Said differently, the generator part 31 is operated as a driving means of driving the engine 20 by the direct electric current supplied from the direct current bus bar La. The torque applied at this time corresponds to a difference between the torque generated by the engine 20 when the fuel supply amount is increased to an extent of avoiding the deterioration of the combustion state and the torque inherently necessary to accelerate the engine 20. Said differently, the torque insufficiency for increasing the revolution speed of the engine 20 is assisted by the generator part 31.

When the generator part 31 assists the engine 20, the fuel supplied to the engine 20 is suppressed to be an amount with which the combustion state is not deteriorated.

Therefore, the acceleration period of the engine 20 can be shortened while preventing the deterioration of the combustion state of the engine 20.

There is a case where the engine is assisted by the generator part 31 by supplying power (torque) to the engine body 21 (a flywheel for the engine) and a case where the generator part 31 accelerates by itself to reduce the load on the engine body 21 to assist the acceleration of the engine body 21.

The command signal sending part 2b detects whether the revolution speed reaches the target revolution speed. Until the revolution speed reaches the target revolution speed, the operation is continued in the acceleration mode in step S25.

When the engine 20 reaches the target revolution speed, the command signal sending part 2b generates the revolution speed command signal and the torque command signal so that the engine 20 is operated in the operating state with which the power loaded on the engine corresponding to the required electric power can be most effectively generated. The control returns to the ordinary operation state in step S26.

In the acceleration mode, the control is carried out as described above. Therefore, if the revolution speed of the engine generator 10 reaches the revolution speed with which the engine generator 10 can supply the electric power loaded on the engine in the predicted maximum electric power before the predicted maximum electric power is required, it is possible to reliably supply the electric power loaded on the engine to the direct current bus bar La when the predicted maximum electric power is required.

While the control is done in the acceleration mode, the electric power is supplied from the electric power accumulator 41 so as to maintain the direct current bus bar La to be at the operation voltage. Said differently, not only the required electric power but also all the electric power containing the electric power required for operating the generator part 31 are supplied from the electric power accumulator 41 and the direct current bus bar La is maintained to have the operation voltage.

Figure 4:
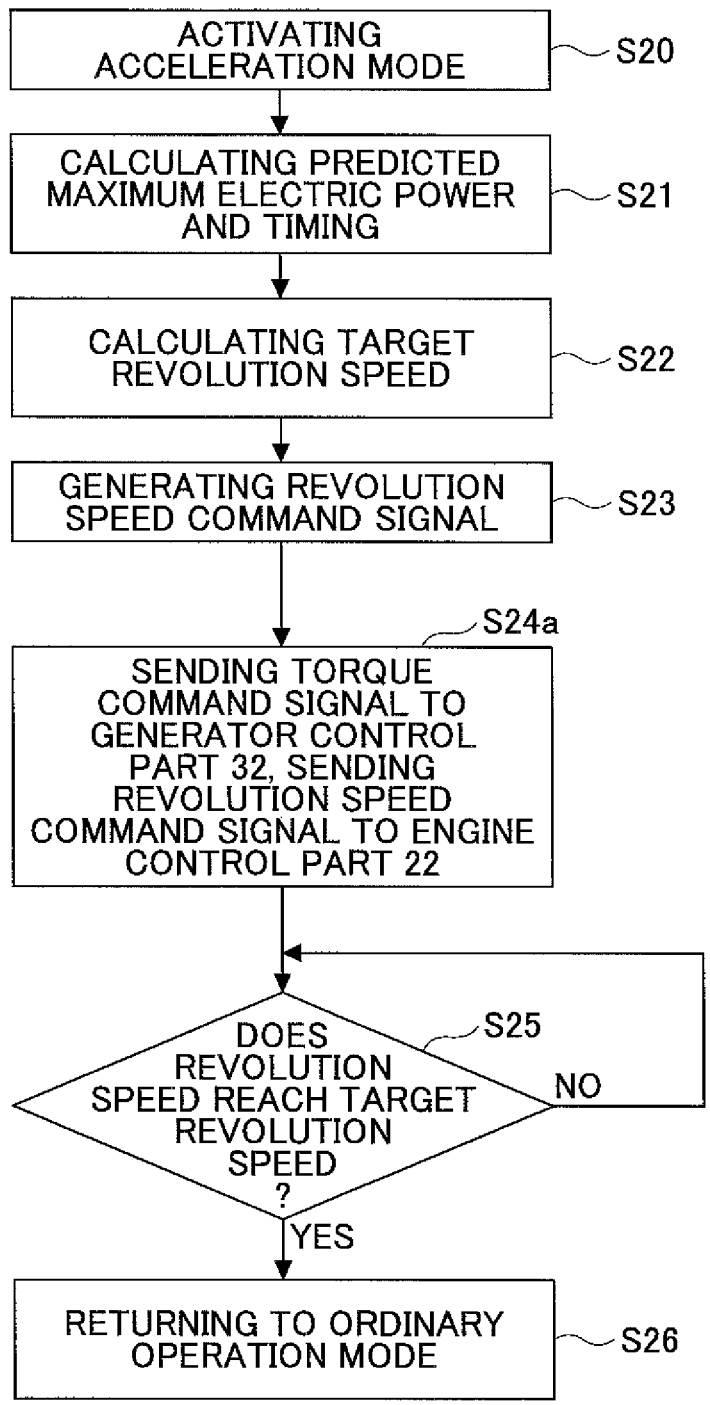
FIG. 4 is another flow chart of an operating state occurring when load suddenly increases while an engine 20 is controlled to rotate in consideration of a revolution speed.

Further, the above description is the case where the command signal sending part 2b sends the revolution speed command signal to the generator control part 32 while the control is done in the acceleration mode. However, referring to FIG. 4, the generator part 31 may assist the engine 20 by calculating the required torque using the known inertia force inherent in the engine generator 10, a predetermined rise-up time (5 seconds) and the target revolution speed and inputting the calculated torque as the torque command into the generator control part 32 as in step S24a. Thus, the generator part 31 may assist the engine 20 (FIG. 4).

Figure 8:
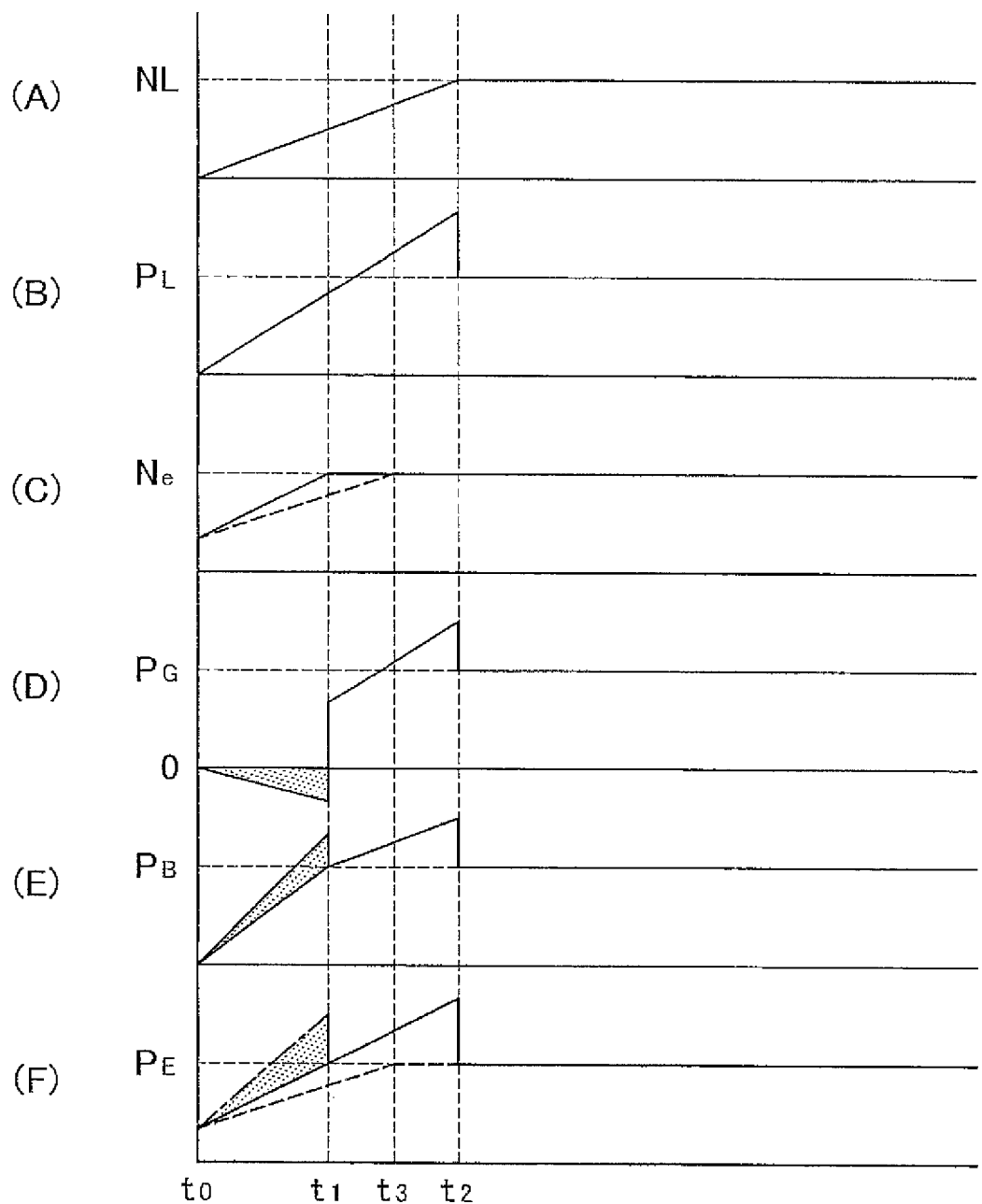
FIG. 8 illustrates a temporal change of the speed of a hoisting motor MM in (A), a temporal change of required electric power when the hoisting motor MM is driven in (B), a temporal change of the engine revolution speed in (C), a temporal change of generated electric power by an engine generator 10 in (D), a temporal change of discharged electric power from the electric power accumulating unit 40 in (E), and temporal changes of an output only from the engine 20 and an assisting output from the generator unit 30 in (F).

Referring to FIG. 8, an example of carrying out the acceleration mode in the portal crane C illustrated in FIG. 9 is described.

FIG. 8 illustrates a temporal change of the speed of a hoisting motor MM in (A), a temporal change of required electric power when the hoisting motor MM is driven in (B), a temporal change of the engine revolution speed in (C), a temporal change of the generated electric power by the engine generator 10 in (D), a temporal change of the discharged electric power from electric power accumulating unit 40 in (E), and temporal changes of the output only from the engine 20 and the assisting output from the generator unit 30 in (F).

When the hoisting motor hoists up the rope, the acceleration of the revolution speed of the hoisting machine is required to end within a predetermined time t2 (e.g., 5 seconds) due to the specification of the crane and the revolution speed of the hoisting machine is required to be changed to a constant rate as illustrated in (A) of FIG. 8. Therefore, the required electric power is calculated so that the acceleration is finished within the predetermined time t2 (e.g., 5 seconds) as illustrated in (B) of FIG. 8.

However, a response of the engine 20 to the increment of the required electric power is insufficient. Therefore, if the required electric power suddenly increases, the revolution speed of the engine 20 may not be suddenly increased so as to associate the increment of the required electric power like a broken line in (C) of FIG. 8.

Therefore, time duration between the time t1 and the time t3 may be necessary until the revolution speed of the engine 20 reaches Ne. As described, under the state in which the revolution speed of the engine (the revolution speed and the supercharging rate on the engine provided with the supercharger), it is impossible to sufficiently increase the output of the engine generator 10 as in a broken line on and after the time t0 of (F) in FIG. 8.

Meanwhile, when the revolution speed of the engine (the revolution speed and the supercharging rate on the engine provided with the supercharger) increases and the engine output becomes PE, it becomes possible to accelerate the revolution speed of the engine 20 so that the required electric power is supplied only by the output from the engine 20.

Therefore, until the revolution speed becomes Ne with which the engine 20 can be accelerated at the time t1 so that only the output from the engine 20 can supply the increment of the required electric power, the generator part 31 is operated to assist the acceleration of the engine 20.

Said differently, the increment rate of the required electric power calculated by the electric power load calculating part 2a is determined to exceed a predetermined threshold value, the generator part 31 is switched from an electricity generating operation to a motoring operation. The generator part 31 is operated to assist the engine 20 by a discharging electric power from the electric power accumulating unit 40 in the hatched area between the times t0 and t1 in (D) of FIG. 8.

Between the times t0 and t1, the discharge electric power from the electric power accumulating unit 40 is consumed by the engine assist operation by the generator part 31 and the hoist operation by the hoisting motor MM. Between the times t0 and t1 of (D) of FIG. 8, a negative value area (a hatched area) designates discharging electric power consumed by the generator part 31 and a positive value area (a blank area) designates discharging electric power consumed by the hoisting motor MM.

When the generator part 31 carries out the engine assist operation, the generator part 31 assists torque insufficient for increasing the revolution speed to the engine 20. With this, the revolution speed of the engine 20 suddenly increases like a solid line on and after the time t0 in (C) of FIG. 8. While the revolution speed is suddenly increasing, the fuel is continuously supplied to the engine 20. During this term, an engine output (a solid line in (F) of FIG. 8) with the assist can be made rapidly larger than an engine output (a broken line in (F) of FIG. 8) without the assist along with the increment of the revolution speed and the fuel supply to the engine. Thereafter, the engine assist operation by the generator part is continued until the time t1 like the dot chain line of (F) of FIG. 8.

Therefore, the revolution speed of the engine can be increased with a high responsivity. The revolution speed of the engine 20 can reach the revolution speed Ne with which the output only of the engine 20 can be increased by the time t1 in (F) of FIG. 8.

Said differently, at the time t1, the engine 20 can obtain the revolution speed and the supercharging rate with which the output of the engine 20 can be sufficiently increased.

At the time t1, since the engine 20 already reaches the revolution speed Ne with which the output only of the engine 20 can be increased, the generator part 31 is switched from the engine assist operation to the electricity generation operation at the time t1 in (D) of FIG. 8. Simultaneously, the electric power consumed from the generator part 31 to assist the engine disappears. Therefore, the corresponding discharging electric power from the electric power accumulating unit 40 also decreases.

Therefore, the discharging electric current from the electric power accumulating unit 40 temporarily decreases at the time t1 in (E) of FIG. 8.

After the time t1, the hoisting motor MM continuously accelerates to thereby continuously increase the required electric power. Therefore, the discharging electric power from the electric power accumulating unit 40 continues to increase.

Meanwhile, since the revolution speed of the engine 20 reaches the revolution speed Ne, the engine 20 can suddenly increase the engine output by the output only from the engine 20 between the times t1 and t2 in (F) of FIG. 8.

When the revolution speed of the engine reaches NL at the time t2, the operation of the hybrid electric power device 1 for the crane is switched to the above-described ordinary operation.

As described, the hybrid electric power device 1 for the crane carries out the engine assist operation using the output from the generator part 31 until the revolution speed of the engine and the supercharging rate with which the engine 20 can sufficiently increase the output from the engine 20. With this, even though there is a delay of the responsivity relative to the increment of the required electric power, the revolution speed of the engine can be increased to Ne within a short time by the engine assist operation of the generator part 31.

Therefore, without degrading the combustion state, the revolution speed of the engine can be increased. Then, the hoisting motor MM can finish the acceleration by the predetermined time t2. As a result, in an ordinary crane such as a portal crane C illustrated in FIG. 9, the hoist operation can be completed within about 50 seconds.

It is also possible to return to the ordinary operation mode before the revolution speed of the engine 20 reaches the target revolution speed. For example, it is also possible to return to the ordinary operation mode when the revolution speed of the engine 20 reaches a revolution speed smaller than the target revolution speed by several percent (%).

3) Regeneration Operation of the Main Unit MP (A Regeneration Mode)

In the crane equipment provided with the hybrid electric power device 1 for the crane of the first embodiment, when the regeneration is carried out by the main unit MP the regenerated electric power is first consumed for the operation of the assist unit SP.

However, if the regenerated electric power exceeds the consumption electric power of the assist unit SP, the remaining electric power is supplied to the direct current bus bar La. Said differently, the electric power is supplied to the hybrid electric power device 1 for the crane from the outside. Then, the electric power supplied to the direct current bus bar La for operating the assist unit SP is left in the hybrid electric power device 1 for the crane.

If there is a margin in the charging rate of the electric power accumulator 41 of the electric power accumulating unit 40 and the voltage of the direct current bus bar La increases with the electric power supplied from the outside, the electric power accumulating unit 40 charges the electric power accumulator 41 so as to maintain the voltage of the direct current bus bar La to be at the operation voltage. However, if the electric power amount to be charged increases, the load on the electric power accumulating unit 40 caused by the charge increases.

Especially, in the hoisting motor MM used in the portal crane C illustrated in FIG. 9, if the time for the regeneration operation is ordinarily long (being about one minute). Therefore, if the entire regenerated electric power regenerated by the hoisting motor hoisting motor is charged to the electric power accumulating unit 40, the electric power accumulating unit 40 may be overcharged. Further, the engine 20 may idle while the hoisting motor carries out the regeneration operation. Therefore, the fuel consumption of the engine 20 is degraded.

Figure 5:
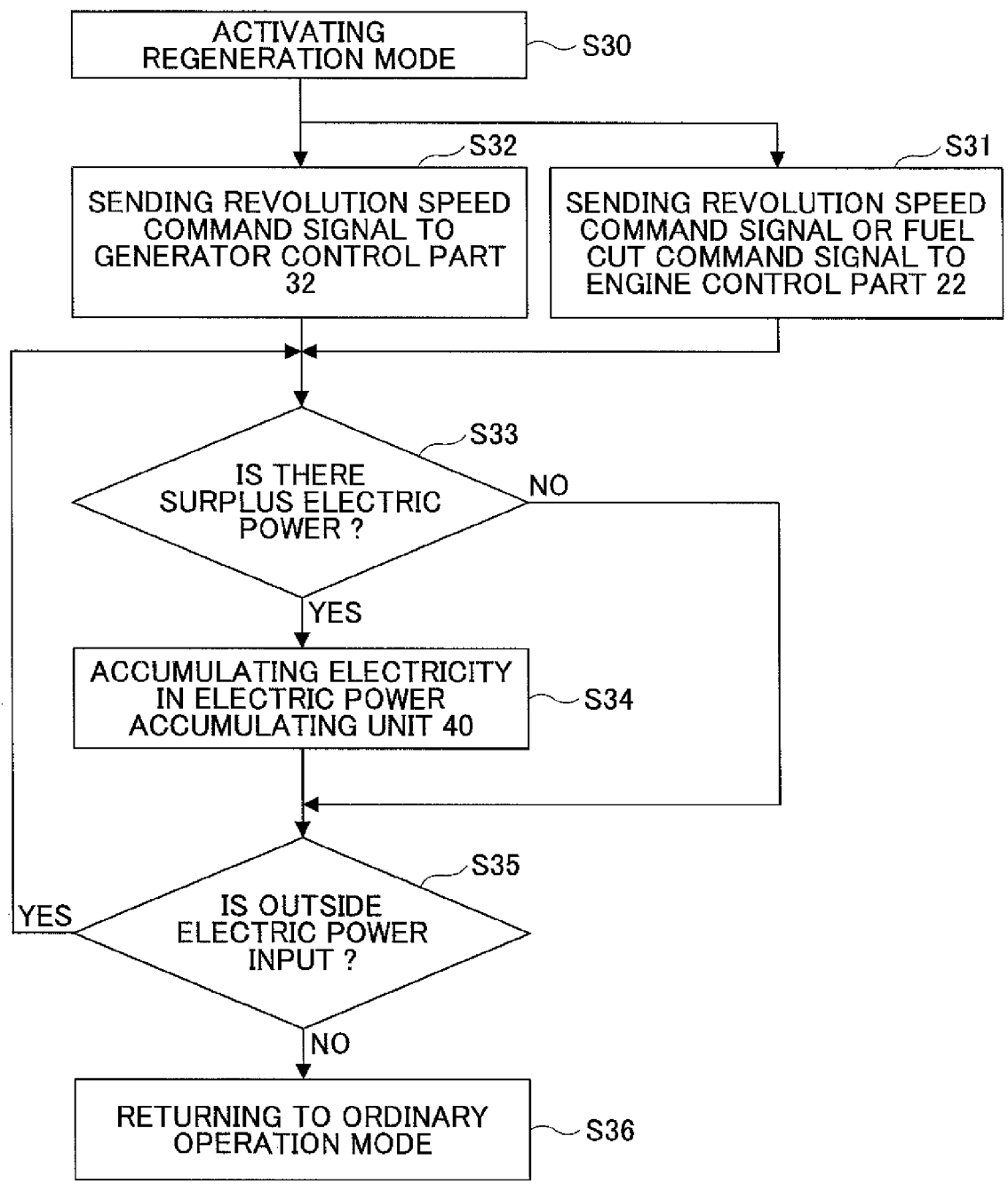
FIG. 5 is a flow chart of an operating state in which a main unit MP undergoes a regeneration operation.

Therefore, in the hybrid electric power device 1 for the crane, if the electric power regenerated exceeds electric power consumption of the assist unit SP, the generator part 31 is operated to drive the engine 20 to consume the regenerated electric power. The electric power which is not consumed by driving the engine 20, namely a surplus electric power, is charged into the electric power accumulator 41 of the electric power accumulating unit 40 as illustrated in FIG. 5.

Said differently, if the regenerated electric power exceeds the electric power consumed by the assist unit SP, the hybrid electric power device 1 for the crane drives the engine 20 by the generator part 31 so as to be operated to suppress the increment of the voltage of the direct current bus bar La. Only when the increment of the voltage of the direct current bus bar La is not suppressed does the electric power accumulating unit 40 charge the surplus electric power to maintain the voltage of the direct current bus bar La to be at the operation voltage.

Then, since the engine 20 is driven by the generator part 31, fuel supplied to the engine body 21 of the engine generator 10 can be decreased. Additionally, because only the surplus electric power is supplied to the electric power accumulating unit 40, the load on the electric power accumulating unit 40 caused by charging and discharging can be decreased.

Specifically, if it is detected that the electric power supplied from the outside (the electric power regenerated by the main unit MP) exceeds the electric power required for operating the assist unit SP, the command signal sending part 2b of the control unit 2 generates the revolution speed command signal and sends the revolution speed command signal to the engine control part 22 of the engine 22 in step S32.

Simultaneously, the command signal sending part of the control unit 2 generates a generator part revolution speed command signal to cause the generator part 31 to operate at a speed of an idling speed plus a certain amount a and sends the generator part revolution speed command signal to the generator control part 32 of the generator unit 30 in step S31.

Since a revolution speed command for the engine body 21 is lower than a revolution speed command for the generator part 31, the generator part 31 is operated to increase the revolution speed of the engine thereby applying engine brake. Therefore, the electric power regenerated by the main unit MP is consumed. As described, the generator part 31 operates to drive the engine 20 to thereby control to consume the regenerated electric power. The electric power which was not consumed by driving the engine 20, namely the surplus electric power, is charged into the electric power accumulating unit 40 in steps S33 and S34.

If the above control is carried out while the main unit MP carries out the regeneration operation, the fuel supplied to the engine body 21 can be decreased and the load on the electric power accumulating unit 40 caused by charging and discharging electricity can be reduced.

In comparison with a case where the electric power supplied from the outside is wasted as thermal energy via a resistance and so on, a part of the electric power contributes improvement of the fuel consumption of the engine 20 and the surplus electric power can be reused by supplying it to the direct current bus bar La from the electric power accumulator 41. Therefore, the electric power supplied from the outside can be effectively used.

Especially, it is preferable to provide the control unit with a function of determining whether the engine body 21 is driven at the speed of the idling speed plus a certain speed a by the regenerated electric power to be supplied to the direct current bus bar La from the outside.

By providing the function and determining that electric power driving the engine body 21 at the speed of the idling speed plus the certain speed α, a fuel cut command signal is sent from the control unit 2 to the engine control part 22 of the engine 2.

Then, the engine 20 is completely operated under an electrically motive state. Therefore, the fuel supplied to the engine body 21 can be completely cut to thereby drastically improve the fuel consumption of the engine generator 10.

Second Embodiment

In the second embodiment, a case where the torque command signal is sent to the engine control part 22, and the revolution speed command signal is sent to the generator control part 32 is described.

Because (1) the waiting state and (4) the regeneration operation of the main unit MP (regeneration mode) are the same as the case where the revolution speed command signal is sent to the engine control part 22 and the torque command signal is sent to the generator control part 32, (2) the ordinary operation state and (3) sudden increment of the required electric power (acceleration mode) for the main unit are now described.

2) Ordinary Operation State

The ordinary operation of the hybrid electric power device 1 for the crane is described.

For ease of explanation, the ordinary operation of the hybrid electric power device 1 is compared to an ordinary operation in the portal crane illustrated in FIG. 9.

Although the voltage of the required electric power varies in the ordinary operation, the rate of the variation, namely an increment rate and a decrement rate of the required voltage are small. For example, the ordinary operation state in the portal crane C illustrated in FIG. 9 is a case where the hoisting motor MM does not operate, the travelling motor RM and the transversely running motor TM operate or a case where the load caused by the hoisting motor MM is small.

In the ordinary operation state, the control unit 2 (e.g., the electric power load calculating part 2*a*) calculates electric power necessary for inverters included in the various motors of the main unit MP (specifically, the inverter for travelling, the inverter for transversely running, the inverter for assist unit and the inverter for hoisting). Thus, the required electric power for the main unit MP is calculated. Then, the control unit 2 determines whether the increment rate of the required electric power exceeds a predetermined threshold value. If the increment rate of the required electric power does not exceed the predetermined threshold value, the control unit 2 determines that the main unit MP is in the ordinary operation state.

In driving the travelling motor RM and the transversely running motor TM, because inertia force of devices and units caused in driving the travelling motor RM and the transversely running motor TM is small, the increment rate of the required electric power does not ordinarily exceed the predetermined threshold value.

When it is determined that the hybrid electric power device 1 for the crane is in the ordinary operation state, the electric power to be loaded on the engine generator 10 and the electric power accumulating unit 40 is calculated by the electric power load calculating part 2*a* of the control unit 2. Then, the command signal sending part 2*b* calculates the output torque and the revolution speed, by which electricity is generated with the small fuel consumption, relative to and based on the electric power loaded on the engine. Then, the revolution speed command signal containing information of the calculated revolution speed and a torque command signal containing information of the calculated output torque are generated and sent respectively to the engine control part 22 and the generator control part 32. Because the output torque of the engine 20 varies in response to the fuel amount supplied to the engine body 21, the command signal sending part 2*b* instructs the minimum fuel amount with which the engine 20 can generate the predetermined output torque by the torque command signal.

The engine control part 22 of the engine 20 controls the engine body 21 so that the fuel of the predetermined amount is supplied to the engine 20 based on the instruction of the fuel amount contained in the torque command signal. Specifically, in a case of the diesel engine, the fuel injection amount is controlled.

On the other hand, the generator control part 32 of the generator unit 30 is controlled so that the generator part 31 rotates at the revolution speed indicated by the revolution speed command signal. Said differently, while the engine body 21 generates the above described output torque, the revolution speed of the generator part 31 is controlled so that the generator part 31 can generate the electric power loaded on the engine. Then, the electric power corresponding to the revolution speed of the engine 20 and the torque of the generator part 31 is generated and the electric power corresponding to the indicated electric power loaded on the engine is supplied to the direct current bus bar La.

The electric power to be loaded on the electric power accumulating unit 40 is supplied to the direct current bus bar La based on the electric power supplying instruction.

Therefore, the predetermined electric power can be supplied from the engine generator 10 and the electric power accumulating unit 40 to the direct current bus bar La. Said differently, the required electric power can be supplied from the hybrid electric power device 1 for the crane to the main unit MP.

Furthermore, the fuel consumption of the engine generator 10 can be improved because the engine body 21 of the engine generator 10 is controlled to be in the operating state with which the engine generator 10 can most efficiently generate the electric power loaded on the engine.

Further, the electric power load calculating part 2*a* of the control unit 2 constantly monitors the required electric power to change the electric power to be loaded on the engine generator 10 and the electric power accumulating unit 40 along with the variation of the required electric power. Then, the command signal sending part 2*b* changes the command signal sent to the engine generator 10. Therefore, even though the required electric power changes, the engine generator 10 can be controlled to be in the optimal operating state.

3) Sudden Increment of the Required Electric Power for the Main Unit MP

In a case where the required electric power of the main unit MP increases, the control unit 2 controls to simultaneously increase electric power to be loaded on the electric power accumulator and electric power to be loaded on the engine thereby satisfactorily supplying the required electric power. Then, the engine generator 10 is controlled to accelerate so as to deal with the increment of the electric power loaded on the engine.

When the required electric power suddenly increases, if the engine generator 10 is suddenly accelerated so as to follow the sudden increment of the required electric power, the combustion state of the engine generator 10 is degraded. In the worst case, the engine stalls to thereby stop the entire system.

Therefore, if the control unit 2 detects that the increment rate of the required electric power for the main unit MP exceeds a predetermined value, the hybrid electric power source device 1 for the crane is operated in the following acceleration mode in order to prevent deterioration of the combustion state of the engine generator 10 (see FIG. 6).

Figure 6:
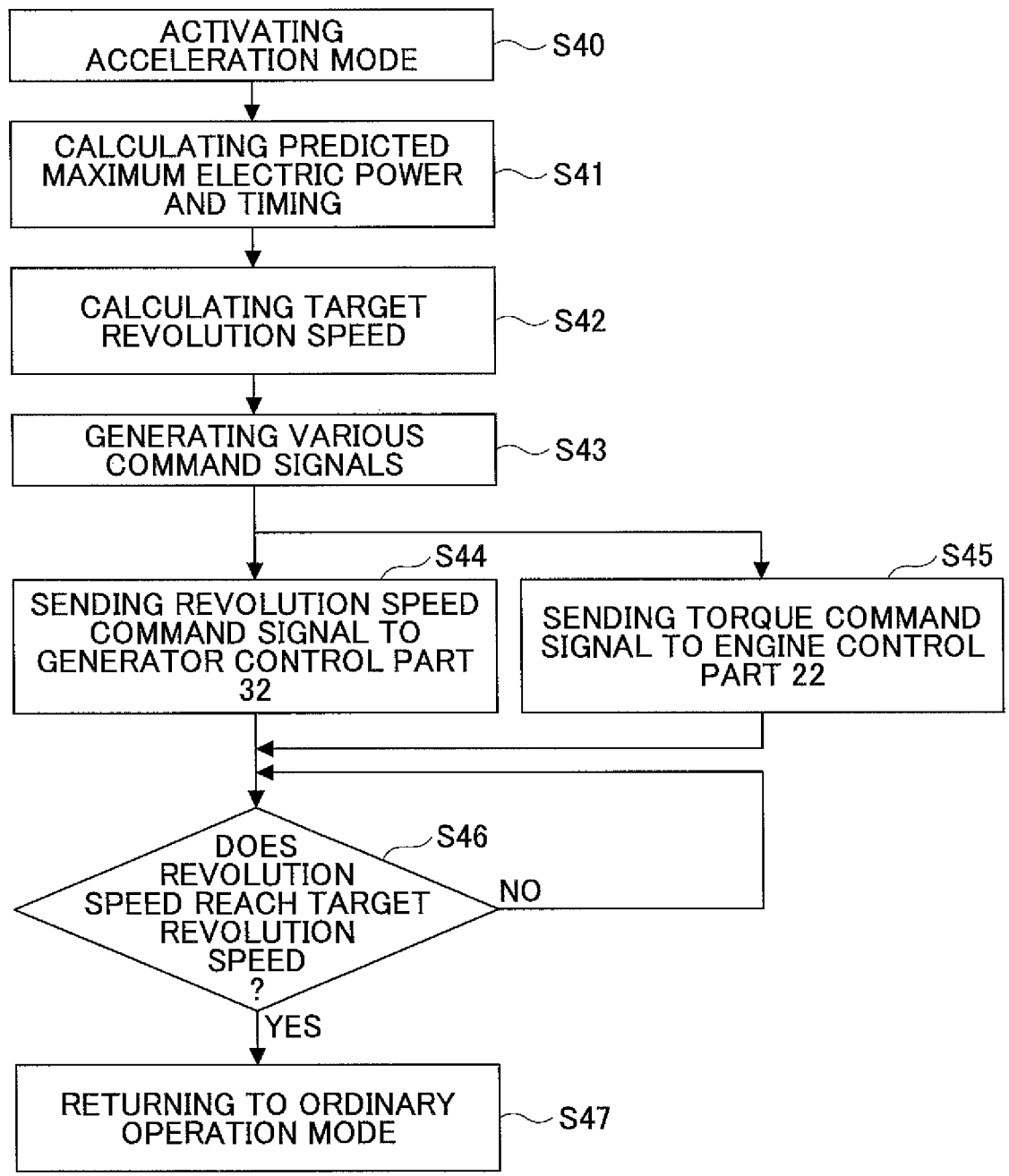
FIG. 6 is a flow chart of an operating state occurring when load suddenly increases while the engine 20 is controlled in consideration of a torque.

When the control unit 2 detects that the increment rate of the required electric power of the main unit MP exceeds the predetermined value, a control in the acceleration mode is started in step S40 in FIG. 6. The electric power load calculating part 2*a* calculates predicted maximum electric power and timing when the predicted maximum electric power is obtained in step S41. Then, the electric power loaded on the engine is calculated. When the calculated electric power loaded on the engine is sent to the command signal sending part 2*b*, the command signal sending part 2*b* calculates the revolution speed of the engine 20 with which the predicted maximum electric power is most efficiently output in step S42.

When the time variation data of the revolution speed are generated, the command signal sending part 2*b* sequentially sends the revolution speed command signal to the generator control part 32 based on the time variation data of the revolution speed in steps S43 and S44.

On the other hand, the command signal sending part 2*b* calculates the maximum fuel supply amount with which a combustion state of the engine does not degrade (e.g., no black smoke) at any revolution speed. The command signal sending part 2*b* generates a torque command signal containing the information of the fuel supply amount. The generated torque command signal is sent to the engine control part 22 in steps S43 and S45.

When the above torque command signal and the above revolution speed command signal are sent to the engine control part 22 and the generator control part 32, the engine 20 accelerates along with the acceleration of the generator part 31. Because the engine 20 may not generate the output torque following the increment of the revolution speed of the generator part 31 with the supplied fuel amount, the generator part 31 assists the engine to supply torque which is insufficient for the increment of the revolution speed. Said differently, the generator part 31 is operated as a driving means of driving the engine 20 by the direct electric current supplied from the direct current bus bar La.

Then, while driving the engine 20 under a condition of not degrading the combustion state of the engine 20, the revolution speed of the engine can be increased by the torque generated by the generator part 31. Therefore, it is possible to prevent degradation of the fuel consumption of the engine 20 and generation of the black smoke during the acceleration, and the acceleration period of the engine 20 can be shortened.

The reason why the degradation of the combustion state of the engine 20 can be prevented when the generator part 31 assists the increment of the revolution speed of the engine 20 is as follows.

When the revolution speed of the engine 20 is accelerated from the present revolution speed to the target revolution speed, the governor operates so as to increase the fuel supply amount to an extent of avoiding the degradation of the combustion state. However, when the increment rate of the required revolution speed is high, even though the fuel supply amount is increased to the above described extent, the revolution speed of the engine 20 may not follow the required revolution speed. This is because responsivity of the engine 20 is low. More specifically, if the amount of injection to the engine 20 becomes great, the air to be supplied is insufficient. Therefore, the engine 20 may not accelerate.

Therefore, the revolution speed of the engine 20 is not sufficiently accelerated to thereby cause a delay in the acceleration. The governor is apt to supply a greater amount of the fuel to increase the revolution speed. In this case, the fuel is excessively supplied and therefore the combustion state is degraded. Under the state in which the revolution speed and a supercharging rate do not increase, the engine 20 may not generate a high enough output by a transient phenomenon. Therefore, if the load on the engine is excessively great, there is a probability that the engine 20 stalls.

If the generator part 31 is instructed to increase its revolution speed under the same condition as the engine 20, the revolution speed of the generator part 31 is accelerated in a required rate of increasing the revolution speed. Therefore, if there is a delay in the acceleration of the engine 20 and the acceleration of the generator part 31 is delayed, the generator control part 32 controls to increase the torque applied to the main shaft of the generator part 31 in order to accelerate the generator part 31 at the designated rate of increasing the revolution speed. Said differently, the generator part 31 is operated as a driving means of driving the engine 20 by the direct electric current supplied from the direct current bus bar La. The torque applied at this time corresponds to a difference between the torque generated by the engine 20 when the fuel supply amount is increased to an extent of avoiding the deterioration of the combustion state and the torque inherently necessary to accelerate the engine 20. Said differently, the torque insufficient for increasing the revolution speed of the engine 20 is assisted by the generator part 31.

When the generator part 31 assists the engine 20, the fuel supplied to the engine 20 is suppressed to be an amount with which the combustion state is not deteriorated.

There is a case where the engine is assisted by the generator part 31 by supplying power (torque) to the engine body 21 (a flywheel for the engine) and a case where the generator part 31 accelerates by itself to reduce the load on the engine body 21 to assist the acceleration of the engine body 21.

The command signal sending part 2b detects whether the revolution speed reaches the target revolution speed. Until the revolution speed reaches the target revolution speed, the operation is continued in the acceleration mode in step S46.

When the engine 20 reaches the target revolution speed, the command signal sending part 2b produces the revolution speed command signal and the torque command signal so that the engine 20 is operated in the operating state with which the power loaded on the engine corresponding to the required electric power can be most effectively generated. The control returns to the ordinary operation state in step S47.

In the acceleration mode, the control is carried out as described above. Therefore, if the revolution speed of the engine generator 10 reaches the revolution speed with which the engine generator 10 can supply the electric power loaded on the engine in the predicted maximum electric power before the predicted maximum electric power is required, it is possible to reliably supply the electric power loaded on the engine to the direct current bus bar La when the predicted maximum electric power is required.

While the control is carried out in the acceleration mode, the electric power command signal is sent to the electric power control unit 43 so that the electric power necessary for operating the generator part 31 is supplied from the electric power accumulating unit 40. Said differently, the electric power command signal is sent to the electric power control unit 43 so that the required electric power is entirely supplied from the electric power accumulator 41 including the electric power required to operate the generator part 31.

With the second embodiment, when the portal crane C is operated in the acceleration mode, time variations such as a time variation of the speed of the hoisting motor MM, a time variation of the required electric power in driving the hoisting motor MM, a time variation of the revolution speed of the engine, a time variation of the electric power generated by the generator part, a time variation of the discharging electric power discharged from the electric power accumulating unit, and a time variation of the engine output becomes the time variations illustrated in FIG. 8.

It is also possible to return to the ordinary operation mode before the revolution speed of the engine 20 reaches the target revolution speed. For example, it is also possible to return to the ordinary operation mode when the revolution speed of the engine 20 reaches a revolution speed smaller than the target revolution speed by several percent (%).

(Emergency Control)

If the command signal is not sent to the various devices and units by a failure of the control unit 2 or the like, by enabling to automatically operate the engine generator 10 at a rated speed, it is possible to maintain electric power supply to the main unit MP, the assist unit SP and so on.

(Electric Power Source Device)

With the first aspect of the invention, it is possible to activate the engine generator in a condition causing the fuel consumption to be the best in generating electric power. Therefore, the electric power can be most efficiently supplied to the outside.

With the second aspect of the invention, if the engine is accelerated to reach a predetermined revolution speed, the acceleration can be assisted by a generator part of a generator unit. Therefore, the time for accelerating the engine can be shortened. Further, because the generator part of the generator unit assists the acceleration of the engine, even if the engine is being accelerated, the engine can be activated while avoiding an abnormal combustion state. Therefore, if the load suddenly increases, sufficient electric power can be supplied from the engine generator. Therefore, it is possible to prevent the fuel consumption of the engine generator from degrading and to prevent black smoke from being generated.

With the third aspect of the invention, when the engine reaches a predetermined revolution speed, the operation is quickly changed to the electric power generating operation by the engine. Therefore, load on the electric power accumulating unit can be reduced. With a fourth aspect of the invention, the fuel consumption of the engine generator in a standby state can be improved.

With the fifth aspect of the invention, it is possible to change over the activated state of the engine generator between an electrical generation state of supplying the electric power to the outside and a state of being driven by electric power from the outside by changing the torque to be generated by the generator part of the generator unit. Therefore, even if the electric power supplied to the outside slightly varies, it is possible to maintain the stabilized operating state of the engine.

With the sixth aspect of the invention, if the engine is accelerated to have a revolution speed at which the electric power can be supplied from the engine when an increment rate of the load exceeds a predetermined value, the acceleration can be assisted by the generator part of the generator unit. Therefore, an acceleration time period of the engine can be shortened. Further, because the generator part of the generator unit assists the acceleration of the engine, even if the engine is being accelerated, the engine can be activated while avoiding an abnormal combustion state. Therefore, if the load suddenly increases, sufficient electric power can be supplied from the engine generator. Therefore, it is possible to prevent the fuel consumption of the engine generator from degrading and to prevent black smoke from being generated.

With the seventh aspect of the invention, it is possible to change over the activated state of the engine generator between the electrical generation state of supplying the electric power to the outside and the state of being driven by electric power from the outside by changing the revolution speed of the generator part of the generator unit. Therefore, even if the electric power supplied to the outside slightly varies, it is possible to maintain the stabilized operating state of the engine.

With the eighth aspect of the invention, if the engine is accelerated to have the revolution speed at which the electric power can be supplied from the engine when an increment rate of the load exceeds a predetermined value, the acceleration can be assisted by the generator part of the generator unit. Therefore, the acceleration time period of the engine can be shortened. Further, because the generator part of the generator unit assists the acceleration of the engine, even if the engine is being accelerated, the engine can be activated while avoiding an abnormal combustion state. Therefore, if the load suddenly increases, sufficient electric power can be supplied from the engine generator. Therefore, it is possible to prevent the fuel consumption of the engine generator from degrading and to prevent black smoke from being generated.

With the ninth aspect of the invention, since an engine brake can be activated, it is possible to consume the electric power supplied from the outside in the generator unit. Further, since the fuel supplied to the engine can be cut while the engine brake is activated, it is possible to suppress the fuel consumed by the engine.

(Control Method)

With the tenth aspect of the invention, it is possible to activate the engine generator in the condition causing the fuel consumption to be the best in generating electric power. Therefore, the electric power can be most efficiently supplied to the outside.

With the eleventh aspect, if the engine is accelerated to reach a predetermined revolution speed, the acceleration can be assisted by the generator part of the generator unit. Therefore, the time for accelerating the engine can be shortened. Further, because the generator part of the generator unit assists the acceleration of the engine, even if the engine is being accelerated, the engine can be activated while avoiding the abnormal combustion state. Therefore, if the load suddenly increases, sufficient electric power can be supplied from the engine generator. Therefore, it is possible to prevent the fuel consumption of the engine generator from degrading and to prevent black smoke from being generated. With a twelfth aspect of the invention, when the engine reaches a predetermined revolution speed, the operation is quickly changed to the electric power generating operation by the engine. Therefore, load on the electric power accumulating unit can be reduced.

According to the thirteenth aspect of the invention, the fuel consumption of the engine generator in the standby state can be improved.

With the fourteenth aspect of the invention, it is possible to change over the activated state of the engine generator between the electrical generation state of supplying the electric power to the outside and the state of being driven by electric power from the outside by changing a torque of the generator part of the generator unit. Therefore, even if the electric power supplied to the outside slightly varies, it is possible to maintain the stabilized operating state of the engine.

With the fifteenth aspect of the invention, if the engine is accelerated to have a revolution speed at which the electric power can be supplied from the engine when an increment rate of the load exceeds a predetermined value, the acceleration can be assisted by the generator part of the generator unit. Therefore, the acceleration time period of the engine can be shortened. Further, because the generator part of the generator unit assists the acceleration of the engine, even if the engine is being accelerated, the engine can be activated while avoiding the abnormal combustion state. Therefore, if the load suddenly increases, sufficient electric power can be supplied from the engine generator. Therefore, it is possible to prevent the fuel consumption of the engine generator from degrading and to prevent black smoke from being generated.

With the sixteenth aspect of the invention, it is possible to change over the activated state of the engine generator between the electrical generation state of supplying the electric power to the outside and the state of being driven by electric power from the outside by changing the revolution speed of the generator part of the generator unit. Therefore, even if the electric power supplied to the outside slightly varies, it is possible to maintain the stabilized operating state of the engine.

With the seventeenth aspect of the invention, if the engine is accelerated to have a revolution speed at which the electric power can be supplied from the engine when an increment rate of the load exceeds a predetermined value, the acceleration can be assisted by the generator part of the generator unit. Therefore, the acceleration time period of the engine can be shortened. Further, because the generator part of the generator unit assists the acceleration of the engine, even if the engine is being accelerated, the engine can be activated while avoiding the abnormal combustion state. Therefore, if the load suddenly increases, sufficient electric power can be supplied from the engine generator. Therefore, it is possible to prevent the fuel consumption of the engine generator from degrading and to prevent black smoke from being generated.

With the eighteenth aspect of the invention, since the engine brake can be activated, it is possible to consume the electric power supplied from the outside in the generator unit. Further, because fuel supplied to the engine can be cut while the engine brake is activated, the fuel consumed by the engine is suppressed.

The embodiments of the present invention are applicable to a hybrid electric power device for a crane such as a gantry crane and a jib crane mounted with tires driven by an engine generator and supplying electric power to a direct current bus bar of inverter in crane equipment including the crane.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

What is claimed is:

1. A hybrid electric power device for a crane comprising:
   an engine generator;
   an electric power accumulating unit; and
   a control unit including
      an electric power load calculating part configured to calculate an electric power loaded on the engine based on required electric power required from an outside load and charging electric power exerted by an electric power accumulating unit, and
      a command signal sending part configured to calculate output torque and a revolution speed based on the electric power loaded on an engine and sending a torque command signal indicative of the output torque to the engine generator and a revolution speed command signal indicative of the revolution speed to the engine generator.

2. The hybrid electric power device for the crane, according to claim 1, wherein
   the engine generator includes an engine and a generator part capable of functioning as a generator and a motor that is connected to an output shaft of the engine, and
   when an increment rate of the required electric power exceeds a predetermined value, the generator part assists rotation of the engine by the generator part until the revolution speed of the engine reaches a predetermined revolution speed.

3. The hybrid electric power device for the crane according to claim 2, wherein
   a function of the generator part changes from the motor for assisting the rotation of the engine to the generator for generating electric power using the engine.

4. The hybrid electric power device for the crane according to claim 1, wherein
   the outside load includes a main unit and an assist unit, and
   the revolution speed of the engine where a main unit requiring power does not exist is lower than the revolution speed of the engine where the main unit requiring power exists.

5. The hybrid electric power device for the crane according to claim 1, wherein
   the engine generator includes
      an engine including an engine body and an engine control part for controlling activation of the engine body, and
      a generator unit including a generator part capable of functioning as a generator and a motor that is connected to an output shaft of the engine and a generator control part for controlling activation of the generator part, and
   the command signal sending part sends the revolution speed command signal containing information indicative of the revolution speed of the engine to the engine control part and sends the torque command signal indicative of torque to be generated in the generator part of the generator unit to the generator control part.

6. The hybrid electric power device for the crane according to claim 5, wherein
   the command signal sending part calculates time variation data of the revolution speed for accelerating the generator part of the generator unit so that the revolution speed of the engine corresponding to the electric power load on the engine satisfying a maximum electric power value of the required electric power is attained when an increment rate of the required electric power exceeds a predetermined value before the required electric power reaches the maximum electric power value, and sends the revolution speed command signal generated based on the time variation data of the revolution speed to the engine control part and the generator control part.

7. The hybrid electric power device for the crane according to claim 1, wherein
   the engine generator includes
      an engine including an engine body and an engine control part for controlling activation of the engine body, and
      a generator unit including a generator part capable of functioning as a generator and a motor that is connected to an output shaft of the engine and a generator control part for controlling activation of the generator part, and
   the command signal sending part of the control unit sends the torque command signal containing information indicative of an output torque of the engine to the engine generator and a revolution speed command signal indicative of the revolution speed, and sends the revolution speed command signal containing information indicative of the revolution speed of the generator part of the generator unit to the generator control part.

8. The hybrid electric power device for the crane according to claim 7, wherein
   the command signal sending part calculates time variation data of the revolution speed far accelerating the generator part of the generator unit so that the revolution speed of the engine corresponding to the electric power load on the engine satisfying a maximum electric power value of the required electric power is attained when an increment rate of the required electric power exceeds a predetermined value before the required electric power reaches the maximum electric power value, sends the revolution speed command signal generated based on the time variation data of the revolution speed to the generator control part, and calculates the output torque enabling acceleration of the generator part while avoiding a combustion state of the engine from degrading during an acceleration period of the generator part, and sends the torque command signal generated based on the output torque to the engine control part.

9. The hybrid electric power device for the crane according to claim 1, wherein the control unit controls the engine generator so that the engine is driven by the generator part in an electrically motive state.

10. A control method for a hybrid electric power device for a crane including an engine generator and an electric power accumulating unit, the control method comprising:

calculating an electric power loaded on the engine generator based on required electric power required from an outside load and charging electric power exerted by the electric power accumulating unit;

calculating output torque and a revolution speed based on the electric power loaded on an engine; and sending a torque command signal indicative of the output torque to the engine generator and a revolution speed command signal indicative of the revolution speed to the engine generator.

11. The control method according to claim 10, wherein the engine generator includes an engine and a generator part capable of functioning as a generator and a motor that is connected to an output shaft of the engine, and when an increment rate of the required electric power exceeds a predetermined value, the generator part assists rotation of the engine by the generator part until the revolution speed of the engine reaches a predetermined revolution speed.

12. The control method according to claim 11, wherein a function of the generator part changes from the motor for assisting the rotation of the engine to the generator for generating electric power using the engine.

13. The control method according to claim 10, wherein the outside load includes a main unit and an assist unit, and the engine is controlled such that the revolution speed of the engine where a main unit requiring power does not exist is lower than the revolution speed of the engine where the main unit requiring power exists.

14. The control method according to claim 10, wherein the engine generator includes an engine and a generator unit including a generator part capable of functioning as a generator and a motor that is connected to an output shaft of the engine, and the revolution speed of the engine and torque to be generated in the generator unit are controlled to adjust electric power generated by the engine generator.

15. The control method according to claim 14, wherein when an increment rate of the required electric power exceeds a predetermined value, the engine is accelerated by functioning a speed regulator so that a revolution speed of the engine with which electric power loaded on the engine corresponding to a maximum electric power value of the required electric power is attained before the required electric power reaches the maximum electric power value, and the generator part of the generator unit is accelerated at a same speed as the revolution speed of the engine.

16. The control method according to claim 10, wherein the engine generator includes an engine and a generator unit including a generator part capable of functioning as a generator and a motor that is connected to an output shaft of the engine, and the electric power generated by the engine generator is adjusted by controlling the output torque of the engine and a revolution speed of the generator part of the generator unit.

17. The control method according to claim 16, wherein when an increment rate of the required electric power exceeds a predetermined value, the engine is controlled to generate the output torque to an extent of not degrading a combustion state of the engine, and the generator part of the generator unit is accelerated so that a revolution speed of the engine with which electric power loaded on the engine corresponding to a maximum electric power value of the required electric power is attained before the required electric power reaches the maximum electric power value.

18. The control method according to claim 10, wherein when the electric power is supplied from an outside the engine is driven by the generator part of the generator unit in an electrically motive state.

* * * * *